US007920112B2

(12) United States Patent
Kurihara et al.

(10) Patent No.: US 7,920,112 B2
(45) Date of Patent: Apr. 5, 2011

(54) ELECTRONIC PAPER SYSTEM, IMAGE PROCESSING APPARATUS FOR ELECTRONIC PAPER SYSTEM STORAGE MEDIUM STORING IMAGE PROCESSING PROGRAM, AND IMAGE WRITING METHOD USING IMAGE PROCESSING APPARATUS

(75) Inventors: Yoko Kurihara, Kanagawa (JP); Ikutaroh Nagatsuka, Kanagawa (JP); Tsunemasa Mita, Kanagawa (JP); Minoru Koshimizu, Kanagawa (JP); Yasunori Saito, Kanagawa (JP); Tsutomu Ishii, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1035 days.

(21) Appl. No.: 11/349,243

(22) Filed: Feb. 8, 2006

(65) Prior Publication Data

US 2007/0058178 A1 Mar. 15, 2007

(30) Foreign Application Priority Data

Sep. 13, 2005 (JP) ................................ 2005-265535

(51) Int. Cl.
*G06K 15/02* (2006.01)

(52) U.S. Cl. .......................................... 345/84; 358/1.2

(58) Field of Classification Search .................... 345/84; 358/1.2

See application file for complete search history.

(56) References Cited

U.S. PATENT DOCUMENTS

| | | | | |
|---|---|---|---|---|
| 6,122,403 | A * | 9/2000 | Rhoads | 382/233 |
| 6,570,700 | B2 * | 5/2003 | Engler et al. | 359/296 |
| 6,707,479 | B1 * | 3/2004 | Pan et al. | 347/112 |
| 6,724,434 | B1 * | 4/2004 | Aaltonen | 348/565 |
| 6,917,349 | B2 * | 7/2005 | McGowan et al. | 345/30 |
| 6,982,734 | B2 * | 1/2006 | Pan et al. | 347/120 |
| 7,065,715 | B2 * | 6/2006 | Sugiyama et al. | 715/838 |
| 7,070,098 | B1 * | 7/2006 | Lapstun et al. | 235/432 |
| 7,158,278 | B2 * | 1/2007 | Kastalsky | 359/290 |
| 7,222,306 | B2 * | 5/2007 | Kaasila et al. | 715/801 |
| 2002/0118165 | A1 * | 8/2002 | McGowan et al. | 345/156 |
| 2004/0012828 | A1 * | 1/2004 | Soda | 358/474 |
| 2004/0066536 | A1 | 4/2004 | Takamine et al. | |
| 2004/0113865 | A1 * | 6/2004 | Oku et al. | 345/4 |
| 2005/0073571 | A1 * | 4/2005 | Pan et al. | 347/112 |

(Continued)

FOREIGN PATENT DOCUMENTS

JP 06-348808 12/1994

(Continued)

OTHER PUBLICATIONS

Office Action issued in JP Application No. 2005-265535 on Jul. 13, 2010 (with English translation).

(Continued)

*Primary Examiner* — Bipin Shalwala
*Assistant Examiner* — Afroza Y Chowdhury
(74) *Attorney, Agent, or Firm* — Oliff & Berridge, PLC

(57) ABSTRACT

An electronic paper system includes: electronic paper having a display unit that can display and retain an image in a no-power state; image generation means for generating a displaying image by combining a scale-down image of at least a part of a document and an image of at least part of related information of the document; and write means for writing the generated displaying image into the display unit of the electronic paper so that the display unit displays and retains the generated displaying image.

25 Claims, 22 Drawing Sheets

U.S. PATENT DOCUMENTS

| | | | | |
|---|---|---|---|---|
| 2005/0079386 | A1* | 4/2005 | Brown et al. | 428/690 |
| 2005/0206370 | A1* | 9/2005 | Pan et al. | 324/200 |
| 2005/0225827 | A1* | 10/2005 | Kastalsky | 359/245 |
| 2005/0246621 | A1* | 11/2005 | Ogawa et al. | 715/500 |
| 2005/0280841 | A1* | 12/2005 | Bossut et al. | 358/1.2 |
| 2006/0017659 | A1* | 1/2006 | Ogawa et al. | 345/30 |
| 2006/0078224 | A1* | 4/2006 | Hirosawa | 382/284 |
| 2006/0209213 | A1* | 9/2006 | Baker | 348/578 |
| 2006/0282848 | A1 | 12/2006 | Watanabe et al. | |
| 2007/0211314 | A1* | 9/2007 | Saito et al. | 358/504 |
| 2007/0294028 | A1* | 12/2007 | Gray et al. | 701/209 |

FOREIGN PATENT DOCUMENTS

| | | | |
|---|---|---|---|
| JP | 07-182366 | | 7/1995 |
| JP | 11-003390 | | 1/1999 |
| JP | 2001-337994 | | 12/2001 |
| JP | 2003-116095 | | 4/2003 |
| JP | 2003-346086 | | 12/2003 |
| JP | 2004-38993 | A | 2/2004 |
| JP | 2004-062831 | | 2/2004 |
| JP | 2004-127250 | | 4/2004 |
| JP | A-2004-106495 | | 4/2004 |
| JP | 2004-286952 | | 10/2004 |
| JP | 2004-356820 | A | 12/2004 |

OTHER PUBLICATIONS

Japanese Office Action with English-language translation for Japanese Application No. 2005-265535 mailed Nov. 18, 2010.

* cited by examiner

DOCUMENT DATA

DOCUMENT DATA

DOCUMENT DATA

DOCUMENT DATA

ELECTRONIC PAPER SYSTEM, IMAGE PROCESSING APPARATUS FOR ELECTRONIC PAPER SYSTEM STORAGE MEDIUM STORING IMAGE PROCESSING PROGRAM, AND IMAGE WRITING METHOD USING IMAGE PROCESSING APPARATUS

BACKGROUND OF THE INVENTION (i) Field of the Invention

The present invention relates to a technique for utilizing electronic paper of thin type which displays and retains an image on and in its display unit in a no-power state, and more particularly to a technique for allowing a user to write into electronic paper, images which are based on a document and which contributes to the specification of the document.

(ii) Description of the Related Art

The creation, editing, browsing, etc. of documents have been performed in such a way that the electronic data of various media, such as images and texts, are handled by utilizing a computer.

Such browsing of the electronic data documents is generally performed by a method in which the images of the documents are displayed on the display screen of the computer, or in which the images of the documents are printed onto sheets of a paper medium by a printer.

In recent years, electronic paper which is of a flexible thin type like the paper sheet and which can display and retain an image in a no-power state has been developed as a document browsing medium which can be substituted for the paper sheet.

The electronic paper is a device which has a display unit for displaying and retaining an information image in the no-power state. When broadly classified by the form of writing the information image into the display unit, the electronic paper includes auto-write type electronic paper which has the function of writing the image into the display unit by itself on the basis of electronic data, and transfer write type electronic paper in which the image written by projection transfer, thermal transfer or the like is retained in the display unit.

Unlike the paper sheet, such electronic paper is capable of erasing and overwriting the image displayed on and retained in the display unit and can be used repeatedly. Therefore, the promotion of the use of the electronic paper has been desired also from the viewpoints of the saving, etc. of paper resources.

In general, document data are stored and managed in a database or the like storage device. In this regard, when the data of a document are stored in the storage device together with many other document data, there is the problem that the contents of the document are difficult to be confirmed at a look.

In a case, for example, where the data of a document being browsed by a screen display on a personal computer have been stored in a database, or where a document printed on a paper medium (document paper) has been read by a scanner and then stored in a database, the pertinent document can be easily displayed on the screen or printed out again owing to the identifier (URL, ID or the like) of the document data. However, it has been difficult to discriminate which are desired document data in such document data stored in the database.

SUMMARY OF THE INVENTION

The present invention has been made in view of the above circumstances of the related art.

This invention provides, as an illustrative, non-limiting embodiment, an electronic paper system including: electronic paper having a display unit that can display and retain an image in a no-power state; image generation means for generating a displaying image by combining a scale-down image of at least a part of a document and an image of at least part of related information of the document; and write means for writing the generated displaying image into the display unit of the electronic paper so that the display unit displays and retains the generated displaying image.

This invention provides, as an illustrative, non-limiting embodiment, an information processing apparatus for an electronic paper system having a write device which writes an image into a display unit of electronic paper so that the display unit of the electronic paper displays and retains the image in a no-power state. The apparatus includes: image generation means for generating a displaying image by combining a scale-down image of at least a part of a document and an image of at least part of related information image of the document; and output means for outputting the generated displaying image to the write device so that the displaying image is written into the display unit of the electronic paper by the write device.

This invention provides, as an illustrative, non-limiting embodiment, a storage medium readable by a computer, the storage medium storing an image processing program of instructions executable by the computer to perform a function for generating a displaying image that is to be written into a display unit of electronic paper by a write unit and that is to be displayed on and retained in the display unit of the electronic paper in a no-power state. The function includes the steps of obtaining a document scale-down image of at least a part of a document and a related information image of at least part of related information of the document; and combining the document scale-down image and the related information image to generate the displaying image.

This invention provides, as an illustrative, non-limiting embodiment, an image writing method of causing a display unit of electronic paper to display and retain an image in a no-power state using an information processing apparatus, the method including the steps of: generating a displaying image by combining a scale-down image of at least a part of a document and an image of at least part of related information of the document using image generation means of the image processing apparatus; and writing the generated displaying image into the display unit of the electronic paper using a write device annexed to the information processing apparatus under a control of the information processing apparatus.

Accordingly, one of advantages of this invention is to permit the quick specification of desired document data by utilizing electronic paper.

BRIEF DESCRIPTION OF THE DRAWINGS

Preferred embodiment(s) of the present invention will be described in detail based on the following figures, wherein.

DETAILED DESCRIPTION OF THE INVENTION

The present invention will be concretely described in conjunction with embodiments.

First, electronic paper which can be used in the invention will be concretely described with reference to FIGS. 26(*a*)-32.

Figure 26A:
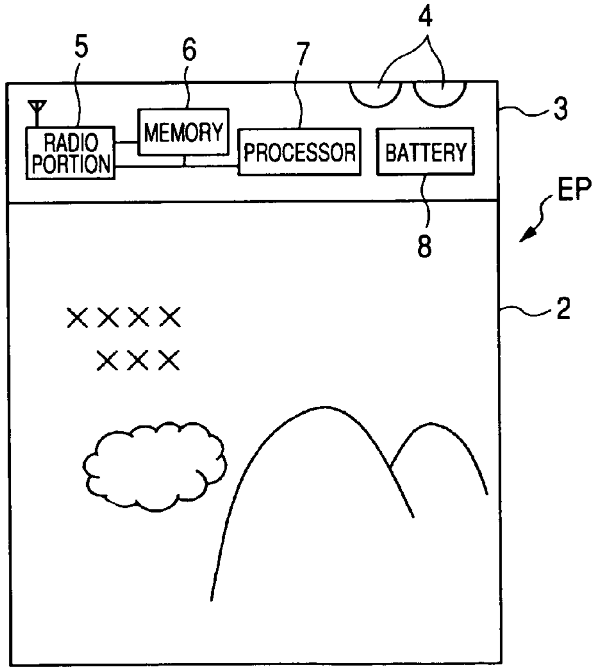
FIGS. 26(*a*) and 26(*b*) are views showing an example of external write type electronic paper.
Figure 26B:
Figure 30A:
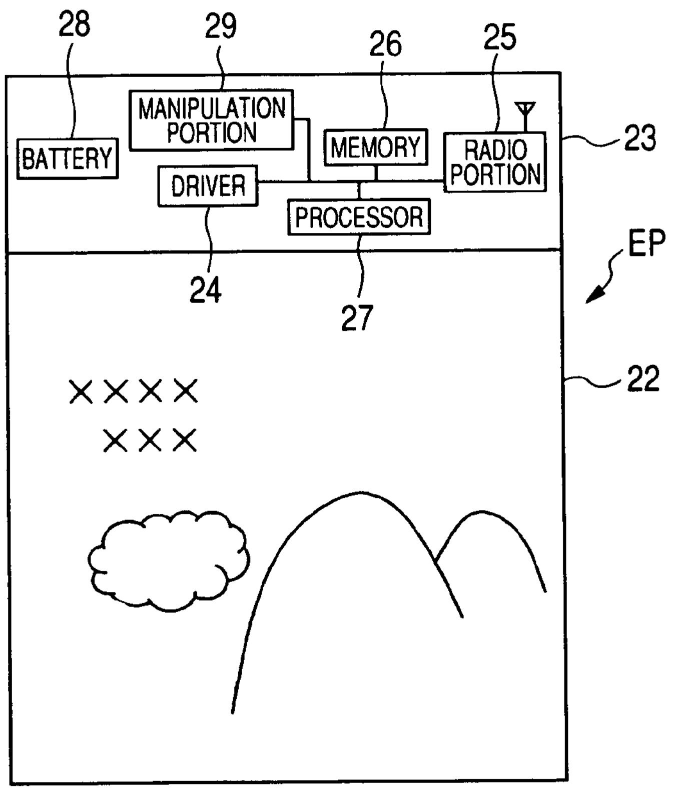
FIGS. 30(*a*) and 30(*b*) are views showing an example of auto-write type electronic paper.
Figure 30B:
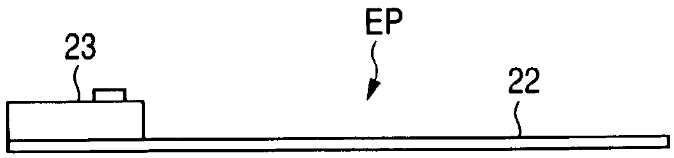

The electronic paper EP is classified into, for example, an external write type shown in FIGS. 26(*a*)-29 and an auto-rewrite type shown in FIGS. 30(*a*)-32, in accordance with a record scheme for an image which is displayed and retained. In any form, the electronic paper EP is an information record and retention device of thin type like ordinary paper, as termed the "electronic paper".

The electronic paper EP of optical write type being an example of the external write type is shown in front view in FIG. 26(*a*), while the optical write type electronic paper EP is shown in side view in FIG. 26(*b*). Incidentally, the illustrated electronic paper EP includes a display unit 2 which displays and retains an image in a no-power state, and a process unit 3 which governs the processes of electronic data such as the URL of document data. Functional portions built in the process unit 3 are also indicated in FIG. 26(*a*).

The optical write type electronic paper EP has a flexible thin structure whose size is that of, for example, a card stipulated by the JIS standards or a sheet of paper of the A4-format. The process unit 3 is disposed on one side of the display unit 2 which occupies most of the area of the electronic paper EP. Incidentally, the size of the display unit 2 is as desired, and in case of employing the electronic paper EP as a tag or card as will be stated later, the display unit 2 is set at a size conforming to the intended use.

The process unit 3 is provided with writing electrodes 4 which serve to apply a voltage for driving the display unit 2 as will be stated later, a radio portion 5 which serves to perform radio communications with the exterior, a memory 6 which retains electronic data so as to be readable and writable, a processor 7 which executes processes such as accessing the memory 6, and a battery 8 which feeds the drive powers of the processor 7, the radio portion 5, etc.

The optical write type electronic paper EP can transmit/receive electronic data by the radio communications of the radio portion 5 with an external radio device (an electronic paper printer in an example which will be explained later), and it can retain the electronic data in the memory 6.

By the way, the process unit 3 which has a comparatively high-grade data processing function is shown in the illustrated example, but a known RFID which is endowed with the function of communicating data by radio and the function of storing data, by a comparatively simple configuration, may well be employed as the process unit 3.

Figure 27:
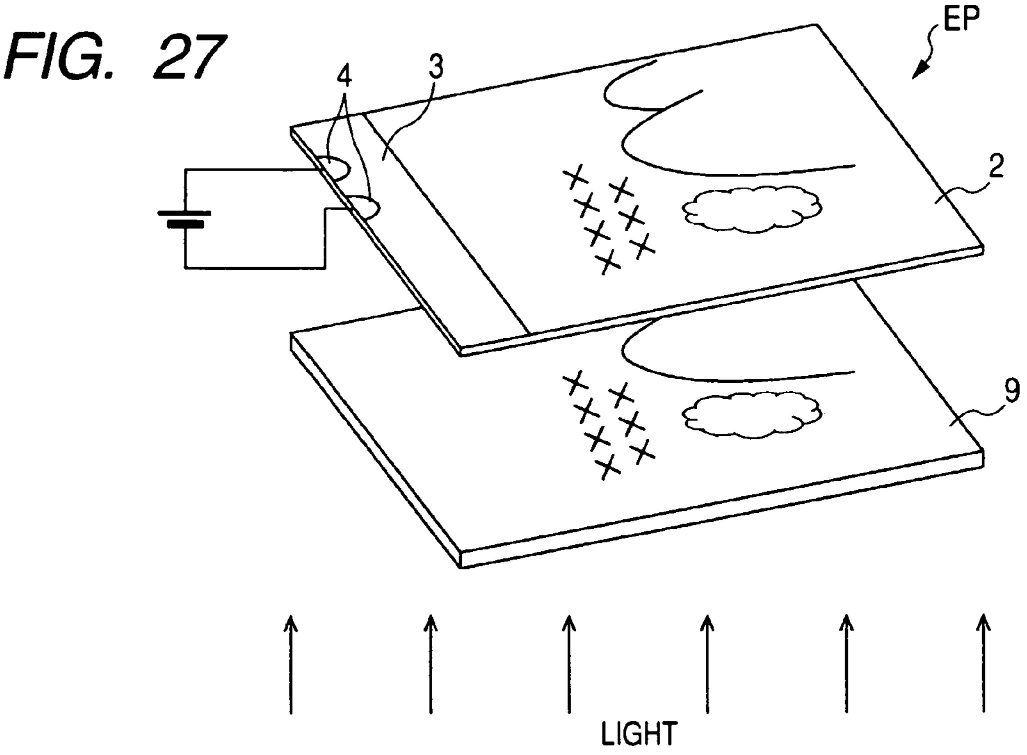
FIG. 27 is a view for explaining the usage of the external write type electronic paper.

As shown in FIG. 27 by way of example, the optical write type electronic paper EP can transfer and store an image displayed on a liquid crystal panel 9, onto and in the display unit 2, in such a way that the image to be written is displayed on the liquid crystal panel 9 and that, with a voltage applied across the electrodes 4 from an external power source, the optical write type electronic paper EP is irradiated with light in superposition on the liquid crystal panel 9. Essentially, the optical write type electronic paper EP has the functions of transferring the projected image onto the display unit 2 when the voltage is applied across the electrodes 4, and continuing to retain the image in a display state even after the voltage applied across the electrodes 4 has been removed.

By the way, in case of employing such optical write type electronic paper EP, the electronic paper printer to be explained later includes means necessary for optical writing, such as a portion for the voltage application across the electrodes 4, the liquid crystal panel 9, and a light irradiation portion. By way of example, a printer stated in JP-A-2004-106495 can be employed as such an electronic paper printer.

Figure 29:
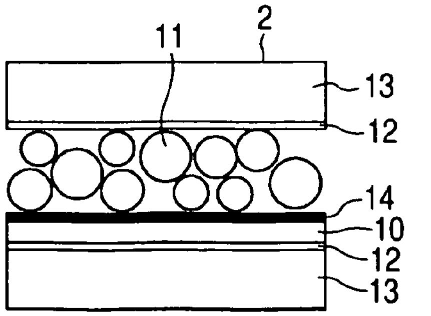
FIG. 29 is a view for explaining the structure of the external write type electronic paper.

As seen from the sectional structure of the display unit 2 shown in FIG. 29, the optical write type electronic paper EP has a structure in which a layer of organic photoconductive material (organic photoconductive layer) 10 that is utilized in a copying machine is combined with a layer of liquid-crystal display material (cholesteric liquid crystal layer put in the form of microcapsules) 11, these layers are sandwiched in between a pair of front and rear transparent electrodes 12, and the resulting laminated body is sandwiched in between a pair of front and rear transparent substrate films 13. Incidentally, this configuration is capable of the monochromatic image display of a white display which is based on the reflection of light by the cholesteric liquid crystal layer 11, and a black display which is based on the transmission of light through the liquid crystal layer 11 and the subsequent absorption of the light by a black layer 14 that is interposed between the cholesteric liquid crystal layer 11 and the organic photoconductive layer 10. Further, a cholesteric liquid crystal has the property that color light corresponding to a spiral pitch is reflected by interference. Therefore, a color display can be incarnated by a simple structure in such a way that the cholesteric liquid crystal layer 11 is configured by stacking liquid crystals of different spiral pitches.

Figure 28:
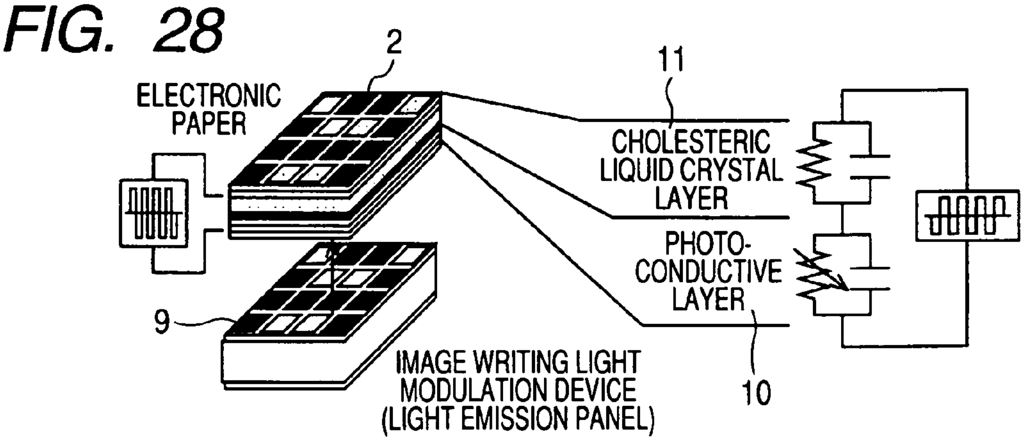
FIG. 28 is a view for explaining the operating principle of the external write type electronic paper.

Besides, as seen from the operating principle of the display unit 2 shown in FIG. 28, when the image to be transferred is displayed on, for example, the light modulation device panel (light emission panel) 9 for writing the image and is projected onto the display unit 2, followed by the application of the voltage across the electrodes 4, the optical write type electronic paper EP converts the intensity of light into a reflection density in a moment and retains the projected image. Further, the image information retained in the display unit 2 can be erased by applying an erase voltage across the electrodes 4, and the optical write type electronic paper EP can be reused many times by repeating the writing and the erasing. Incidentally, when a new image is projected with the voltage applied across the electrodes 4 as stated above, without performing such an erase process, the optical write type electronic paper EP can overwrite image information retained in the display unit 2. The optical write type electronic paper EP can also be reused many times by such overwrite processes.

Besides, another example of the external write type electronic paper is such that the display unit 2 is put into a thermosensitive record structure as is known, and that an image is thermally recorded on the display unit 2 by a thermosensitive record head included in an electronic paper printer, so as to be displayed on and retained in the display unit 2.

By the way, in the system of an embodiment to be explained later, such electronic paper of thermosensitive record type is formed as the card size of the JIS standards, and card type electronic paper EP including an RFID is employed as the process unit 3.

The electronic paper EP of auto-write type is shown in front view in FIG. 30(*a*), while the auto-write type electronic paper EP is shown in side view in FIG. 30(*b*). The illustrated electronic paper EP includes a display unit 22 which displays and retains an image, and a process unit 23 which governs the processes of electronic data. Functional portions built in the process unit 23 are also indicated in FIG. 30(*a*).

The auto-rewrite type electronic paper EP is a flexible display and record device of thin type whose size is that of, for example, the JIS standard card likewise to the above. The process unit 23 is disposed on one side of the display unit 22 which occupies most of the area of the electronic paper EP. Incidentally, the display unit 22 is set at a size conforming to the intended use. Besides, the electronic paper EP may well be configured in such a way that the display unit 22 and the process unit 23 are made detachable from each other, and that the process unit 23 of, for example, clip form is attached and connected to the display unit 22.

The process unit 23 is provided with a driver 24 which drives the display unit 22 as will be stated later, a radio portion 25 which serves to perform radio communications with the exterior such as an electronic paper printer, a memory 26 which retains electronic data so as to be readable and writable, a processor 27 which executes the processes of the electronic data, and a battery 28 which feeds operating powers to the processor 27 and the like functional means.

Such auto-write type electronic paper EP can transmit/receive the electronic data of a display image by the radio communications of the radio portion 25 with an external radio device (such as the electronic paper printer), and it can retain the electronic data in the memory 26.

Besides, the auto-write type electronic paper EP can rewrite and display the image displayed on and retained in the display unit 22, on the basis of the electronic data retained in the memory 26, by driving the driver 24 under the control of the processor 27. This auto-write type electronic paper EP has the function of continuing to retain the image in a display state on the display unit 22 even when the drive power of the driver 24 has been removed.

Figure 32:
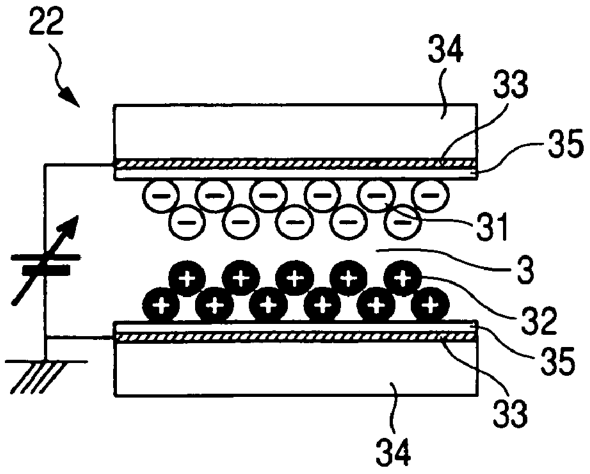
FIG. 32 is a view for explaining the structure of the auto-write type electronic paper.

As seen from the sectional structure of the display unit 22 shown in FIG. 32, the auto-write type electronic paper EP has a structure in which very fine colored particles (in the illustrated example, white particles 31 and black particles 32) that are utilized as toners in a copying machine are enclosed in between a pair of front and rear electrodes 33 being transparent on, at least, the front side thereof, and the resulting laminated body is sandwiched in between a pair of front and rear film substrates 34 being transparent on, at least, the front side thereof. An air layer is formed between the electrode layers 33 in order that the colored particles 31 and 32 may be freely movable. Besides, the electrode layers 33 arrayed in the shape of a matrix are provided with insulating layers 35 which prevent the colored particles 31 and 32 from coming into touch. Incidentally, a color display can also be incarnated in a simple structure by employing color filters.

Figure 31:
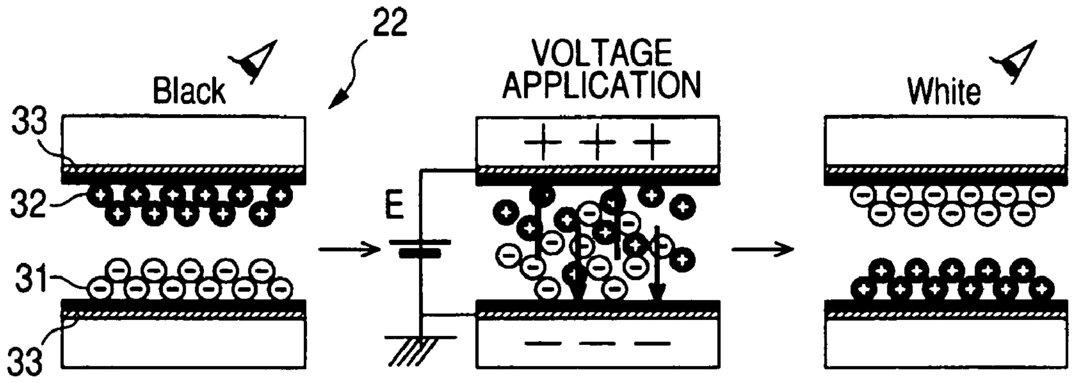
FIG. 31 is a view for explaining the operating principle of the auto-write type electronic paper.

Besides, as seen from FIG. 31 showing the operating principle of the display unit 22, the auto-write type electronic paper EP operates in such a manner that, in a state where no voltage is applied across the electrodes 33 (however, the electrodes 33 are charged in polarities generated in the last drive mode), the white particles 31 charged in minus gather on the rear side, whereas the black particles 32 charged in plus gather on the front side, so the display unit 22 falls into a black state when seen with the eye from the front side. Further, when the driver 24 operates on the basis of electronic data so as to invert the electrode polarities of those required parts of the matrix which correspond to an image to-be-displayed, the positional relations between the white particles 31 and the black particles 32 are replaced, and the image which is based on the contrast between the white particles 31 and the black particles 32 is displayed on the display unit 22. Incidentally, image information items each of which is displayed on the display unit 22 in accordance with the contrast between the white particles 31 and the black particles 32 can be changed-over by operating the driver 24 on the basis of different electronic data, and the auto-write type electronic paper EP can be reused many times.

Figure 1:
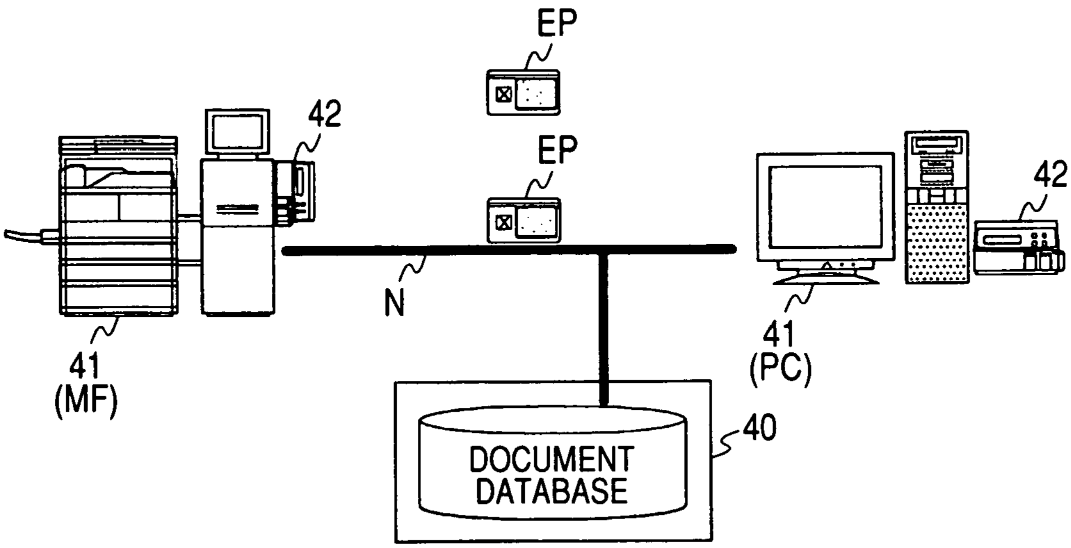
FIG. 1 is a configurational diagram of an electronic paper system according to an embodiment of the present invention.

Shown in FIG. 1 is an example of the whole configuration of an electronic paper system according to an embodiment of the present invention.

The system of this example has the configuration in which a document management server 40 and information processing apparatuses 41 are connected by a network N, and in which electronic paper printers 42 are respectively annexed to the information processing apparatuses 41.

The document management server 40 includes a document database in which document data identified by URLs, respectively, are stored. This document management server 40 performs the storage management of document data received from the information processing apparatuses 41, and it transmits requested document data to the information processing apparatuses 41.

In the illustrated example, a personal computer (PC), and a multifunctional machine (MF) which includes a scanner function, a copying function, a FAX function, etc. in multiple fashion, are employed as the information processing apparatuses 41. A displaying image G as shown in FIG. 3 is printed (transferred) onto and written into transfer type electronic paper (card) EP having an RFID, by the electronic paper printer 42 which is connected to the information processing apparatus 41 as write means.

Figure 3:
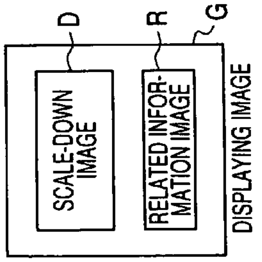
FIG. 3 is a diagram for explaining a displaying image according to the invention.

Shown in FIG. 3 is an example of the displaying image G which is written into the display unit 2 of the electronic paper card EP. The displaying image G has a configuration in which a document scale-down image D is combined with an image R of related information (the number of pages, a retention period, etc.) affixed to a pertinent document.

In the system shown in FIG. 1, processes to be stated below are executed by way of example.

In a state where the electronic paper card EP is set in the electronic paper printer 42 of the multifunctional machine (MF) 41, document paper printed with a document is read by the scanner of the multifunctional machine (MF) 41. The multifunctional machine (MF) 41 stores the read document data and the related information of the document, such as a read date, in the document management server 40 through the network N. Besides, the multifunctional machine (MF) 41 generates the displaying image G which contains the scale-down image and related information image of the read document, so as to write and retain the generated displaying image G into and in the display unit 2 of the electronic paper card EP by the electronic paper printer 42. Further, the multifunctional machine (MF) 41 transmits and stores the URL of the document data stored in the document management server 40, to and in the RFID of the electronic paper card.

Thus, the electronic paper card EP ejected from the electronic paper printer 42 displays and retains the displaying image G which indicates the outline of the document data having been read and stored in the document management server 40, and it stores and retains therein the URL for accessing the document data.

Accordingly, a user can easily search out any desired document by looking at the displaying image G displayed on and retained in the electronic paper card EP. By way of example, the electronic paper card EP is set in the electronic paper printer 42 of the personal computer (PC) 41, a URL is acquired from the RFID of the electronic paper card EP by the RFID access means (so-called "reader writer") of the electronic paper printer 42, and the document management server 40 is accessed on the basis of the URL by the PC 41, whereby the document data associated with the displaying image can be acquired and displayed on a screen.

Besides, in a state where the electronic paper card EP is set in the electronic paper printer 42 of the PC 41, the electronic paper printer 42 is caused to execute a write process concerning document data written in the PC 41, in such a way, for example, that a document data icon displayed on the screen of the PC 41 is dragged and dropped onto an electronic paper printer icon. More specifically, the PC 41 generates the displaying image G of a pertinent document on the basis of the document data and related information affixed thereto, the displaying image G is written into and retained in the display unit 2 of the electronic paper card EP by the electronic paper printer 42, and the URL of the document data is transmitted to and stored in the RFID of the electronic paper card.

Thus, as in the foregoing, the electronic paper card EP ejected from the electronic paper printer 42 displays and retains the displaying image G which indicates the outline of the document data, and it stores and retains therein the URL for accessing the document data.

Besides, by way of example, when the electronic paper card EP is set in the electronic paper printer 42 of the MF 41, the URL can be acquired from the RFID of the electronic paper card EP by the RFID access means of the electronic paper printer 42 (or the RFID access means of the MF 41 if included), and the corresponding document data can be acquired on the basis of the URL by the MF 41 so as to print and output the document paper.

Figure 2:
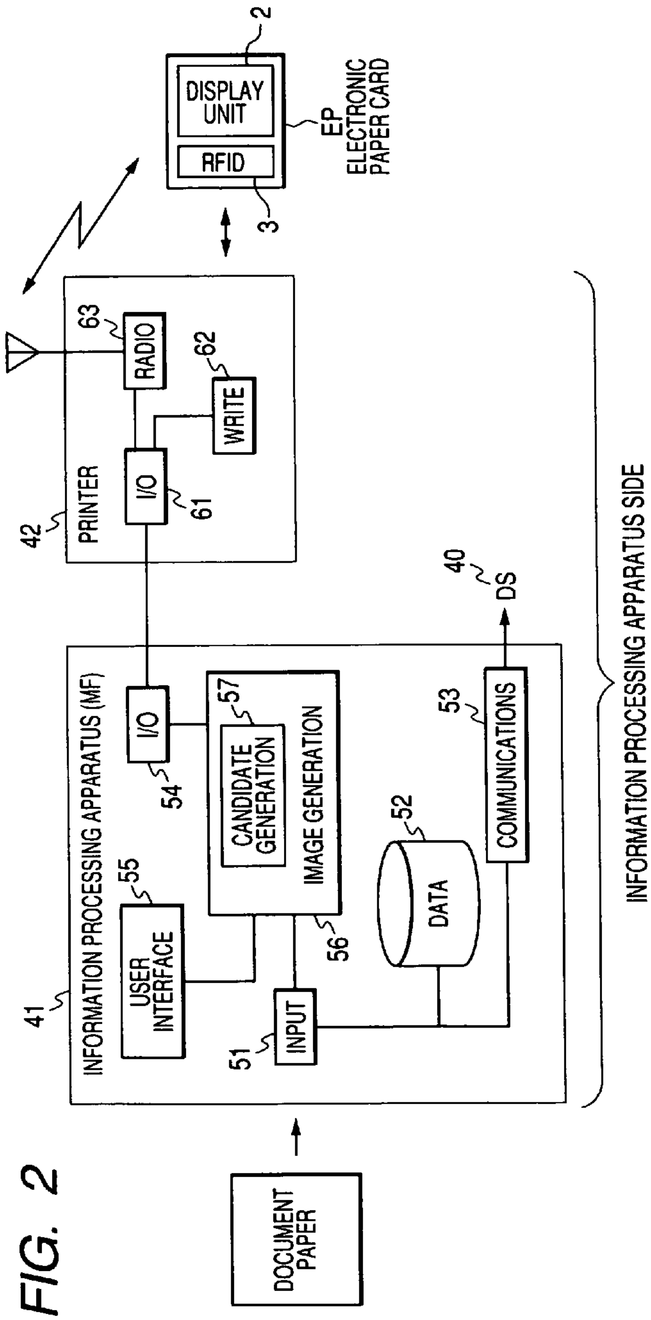
FIG. 2 is a functional configurational diagram according to an embodiment of the invention.

Shown in FIG. 2 is an example of a functional configuration which is included in the information processing apparatus 41 and the electronic paper printer 42 in order to execute the above processes. Incidentally, although the multifunctional machine (MF) is shown as the information processing apparatus 41 in the illustrated example, the same holds true also of the personal computer (PC).

Besides, the information processing apparatus 41 in this example is a computer apparatus, and functional means 51-57 to be stated below are incarnated in such a way that programs according to the invention are run by a computer.

The information processing apparatus (MF) 41 includes the input means 51 for incarnating various input functions necessary for the multifunctional machine, such as a scanner function and a communication function, the memory 52 in which inputted image information and the like data are retained in order to process them, the communication means 53 for performing communications such as the transmission of scanner-read document data to the document management server (DS) 40, the interface (I/O) 54 which is connected with the electronic paper printer 42, the user interface means 55 for presenting information to the user through a screen display and for accepting an instruction input from the user, and the image generation means 56 for generating the displaying image G in which the document scale-down image D and the related information image R of the document are combined as shown in FIG. 3.

Besides, the image generation means 56 has various functions as will be stated below. Especially, the image generation means 56 includes candidate generation means 57 for generating a plurality of displaying image candidates in which the document scale-down image D or the document related-information image R to be contained in the displaying image G is presented in different aspects.

The electronic paper printer 42 includes an interface (I/O) 61 which is connected with the information processing apparatus 41, write means 62 for transferring and writing an image onto and into the display unit 2 of the electronic paper card EP, and radio means 63 for performing the data communications of the document URL, etc. with the RFID 3 of the electronic paper card EP by radio.

By the way, in this example, the information processing apparatus 41 and the electronic paper printer 42 which are apparatuses separate from each other are connected as an information processing apparatus side, but an apparatus in which the information processing apparatus 41 and the electronic paper printer 42 are integrated may well be used as the information processing apparatus side.

Figure 4B:
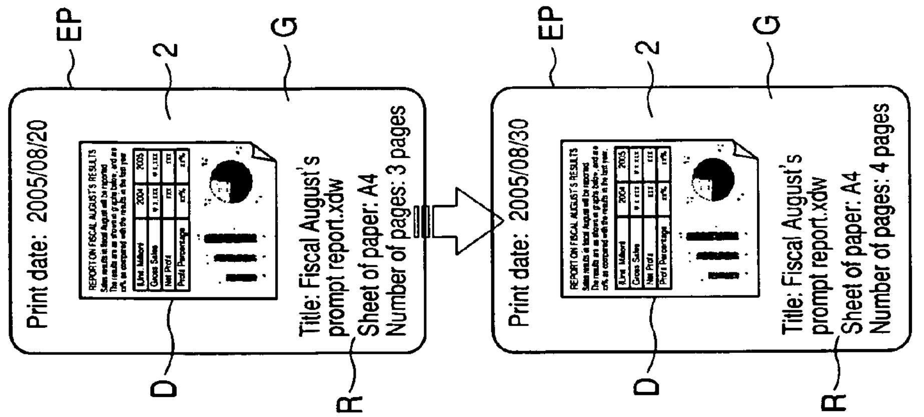
FIGS. 4(*a*) and 4(*b*) are diagrams for explaining an example of the displaying image according to the invention.
Figure 4A:
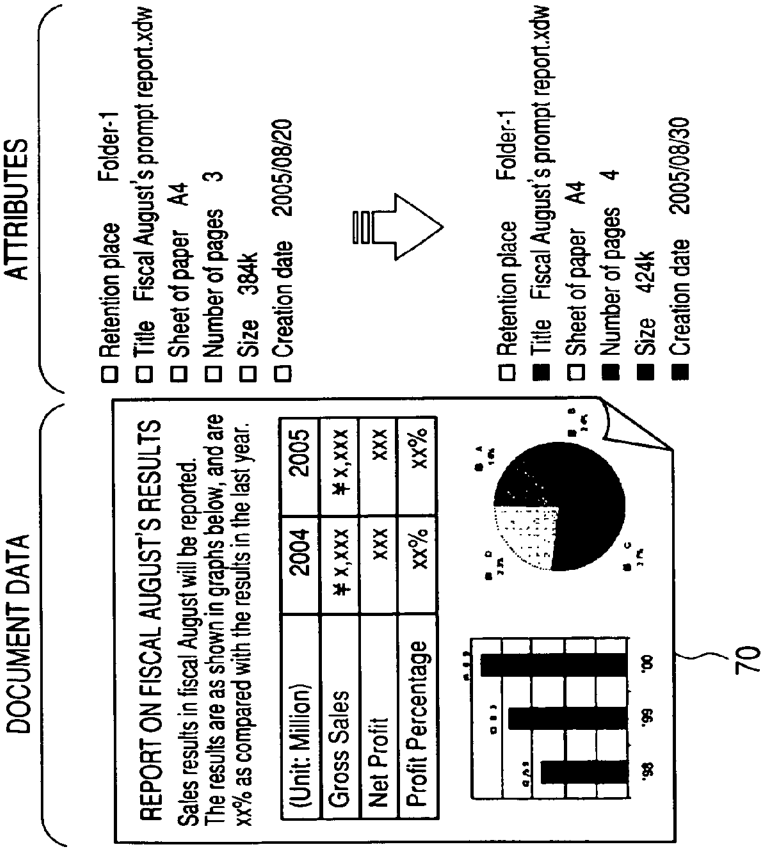

According to the electronic paper system, any of displaying images G in various aspects as shown in FIGS. 4(*a*)-25 by way of example can be generated so as to be displayed on and retained in the display unit 2 of the electronic paper card EP.

Next, the aspects of the displaying images G will be explained. Incidentally, although the URL of the corresponding document data is stored in the RFID of the electronic paper card EP, it shall be omitted from description because it does not directly relate to the aspect of the displaying image G.

In an example shown in FIGS. 4(*a*) and 4(*b*), document data to which attributes (retention place of the document data, document title, sheet size of a document, number of pages of the document, size of the document data, creation date of the document, etc.) are affixed as related information as shown in FIG. 4(*a*), are written into and displayed on the display unit 2 of the electronic paper card EP as the displaying image G as shown in FIG. 4(*b*).

That is, the image generation means 56 generates the scale-down image D from the document data to become display contents 70 and also generates the related information image R expressive of the contents from the attribute information, and it combines the document scale-down image D and the related information image R so as to generate the displaying image G. The write means 62 transfers and writes the displaying image G onto and into the display unit 2 of the electronic paper card EP.

Here, a write process into the electronic paper card EP is executed each time the attribute information of the document data is altered. Then, the electronic paper card EP in which the related information image R indicates the newest attribute information can be obtained as shown in FIGS. 4(*a*) and 4(*b*).

Figure 5B:
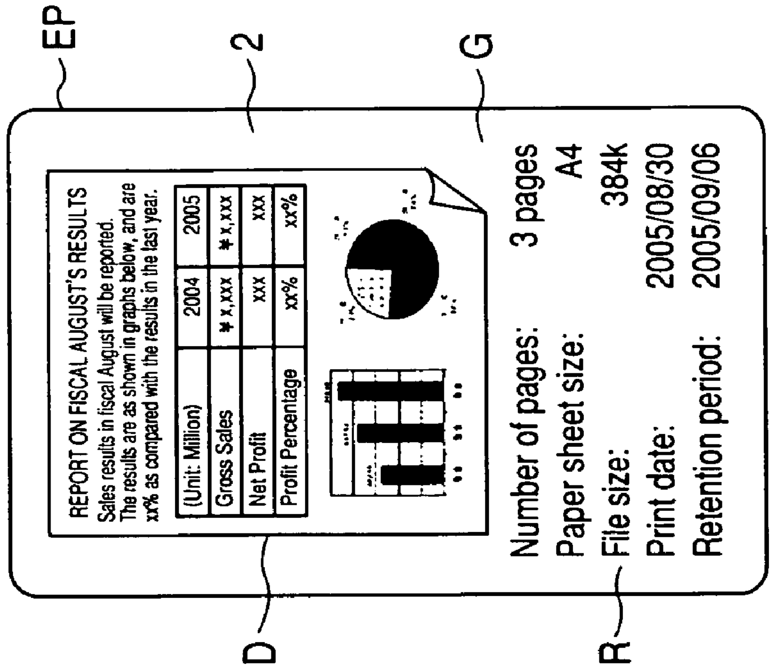
FIGS. 5(*a*) and 5(*b*) are diagrams for explaining an example of the displaying image according to the invention.
Figure 5A:
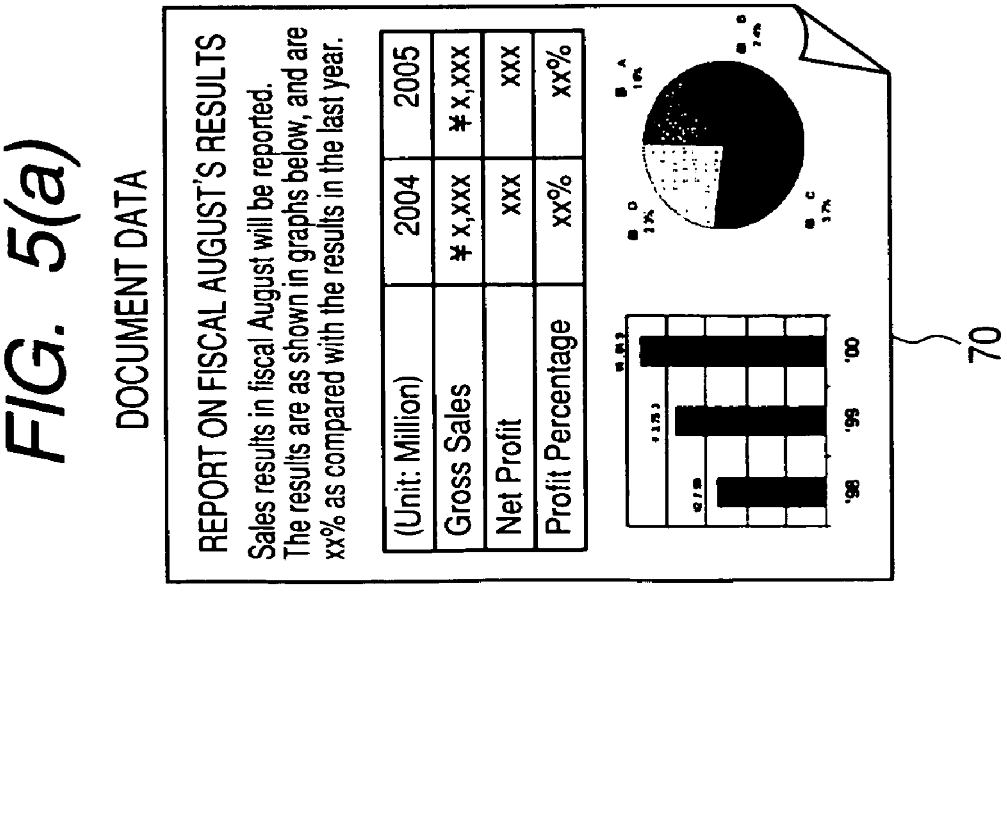

Besides, in a case where a displaying image G is generated from document data of contents 70 as shown in FIG. 5(*a*), the image generation means 56 may cause a related information image R to contain all the items of attribute information (in this example, the number of pages, a paper sheet size, a file size, a print date, and a retention period) affixed to the document data, as shown in FIG. 5(*b*). Alternatively, however, the user is allowed to select items which are to be contained in the related information image R, by displaying the attribute information on the user interface 55, or items which are to be contained in the related information image R are preset in the image generation means 56, whereby the image generation means 56 can generate the displaying image G by generating the related information image R from the selected attribute contents based on the designations or settings.

Figures 6A, 6B:
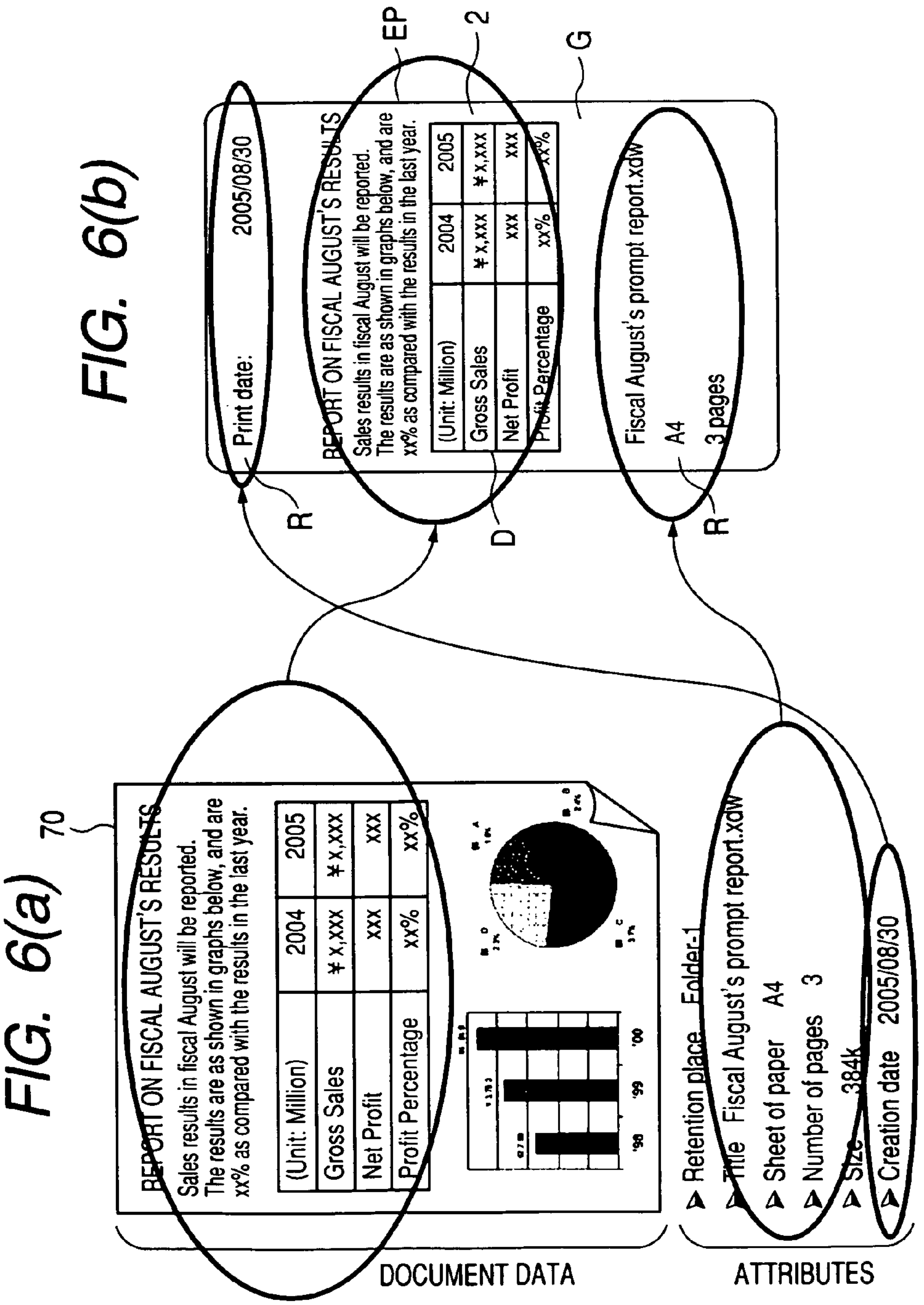
FIGS. 6(*a*) and 6(*b*) are diagrams for explaining an example of the displaying image according to the invention.

In an example shown in FIGS. 6(*a*) and 6(*b*), document data to which attributes being related information (retention place of the document data, document title, paper sheet size of a document, number of pages of the document, size of the document data, creation date of the document, etc.) are affixed as shown in FIG. 6(*a*), are written into and displayed on the display unit 2 of the electronic paper card EP as a displaying image G in which the document contents and some of the attribute items have been selected as shown in FIG. 6(*b*). That is, the user is allowed to select the items which are to be contained in the displaying image G, by displaying the contents 70 of the document and the attribute information on the user interface 55, or the conditions which are to be contained in the displaying image G are preset in the image generation means 56, whereby the image generation means 56 generates the displaying image G from the selected document parts and attribute item parts based on the designations or settings.

Figure 7B:
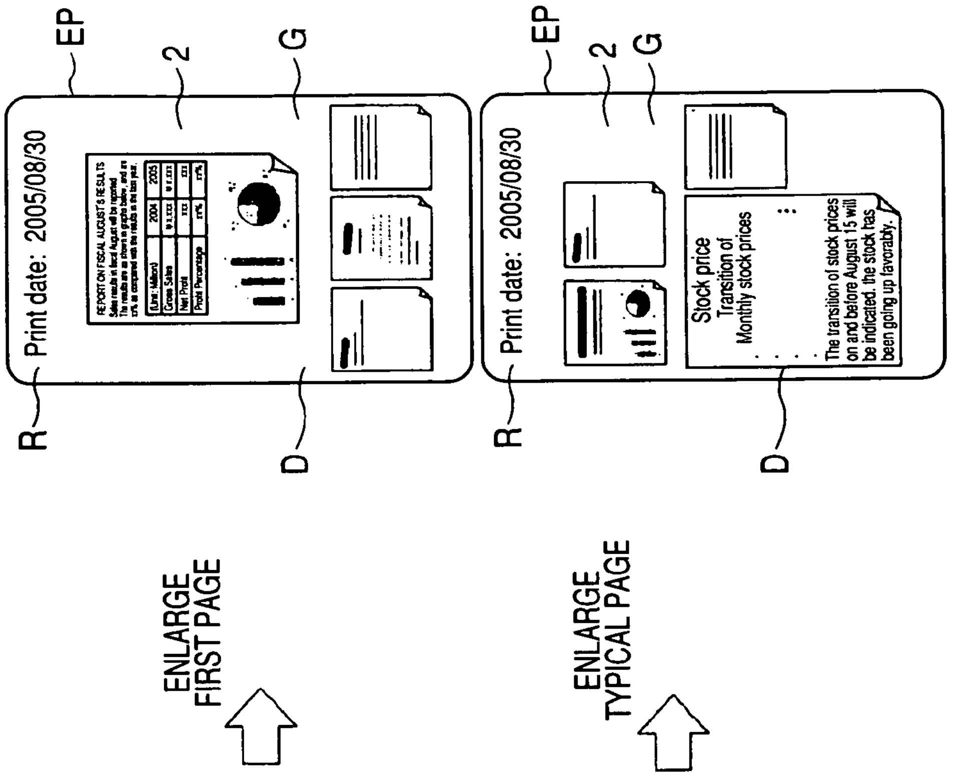
FIGS. 7(*a*) and 7(*b*) are diagrams for explaining an example of the displaying image according to the invention.
Figure 7A:
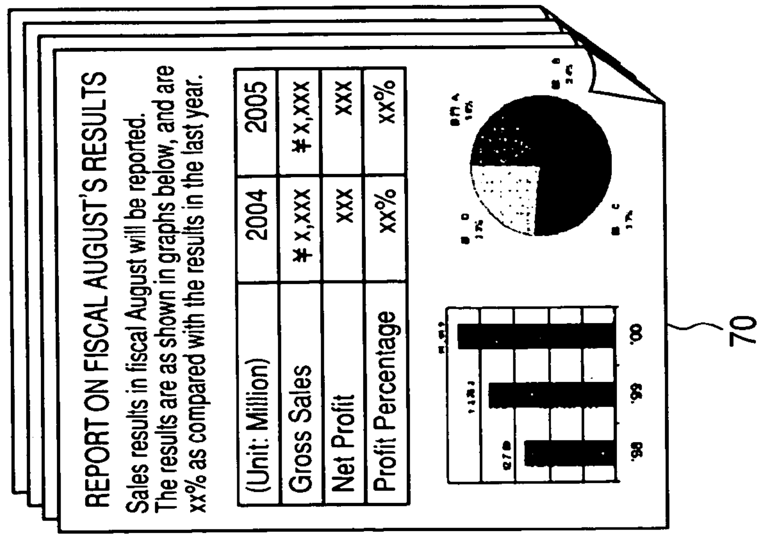

In an example shown in FIGS. 7(*a*) and 7(*b*), the document data of a plurality of pages as shown in FIG. 7(*a*) are used for generating scale-down images D in each of which the pages are arranged on one screen, and the aspects of the scale-down images D are set as a plurality of sorts of candidates, such as the scale-down image D in which the scale-down degree of the first page is small (the size thereof is large), and the scale-down image D in which the scale-down degree of a typical page is small (the size thereof is large), as shown in FIG. 7(*b*). That is, the candidate generation means 57 generates a plurality of displaying image candidates in which the pages have different sizes as shown in FIG. 7(*b*), on the basis of the document data of the plurality of pages, the displaying image candidates are displayed on the user interface 55 in order for the user to select any of them, and the electronic paper printer 42 writes and displays the selected displaying image candidate into and on the electronic paper card EP as a displaying image G.

Figure 8B:
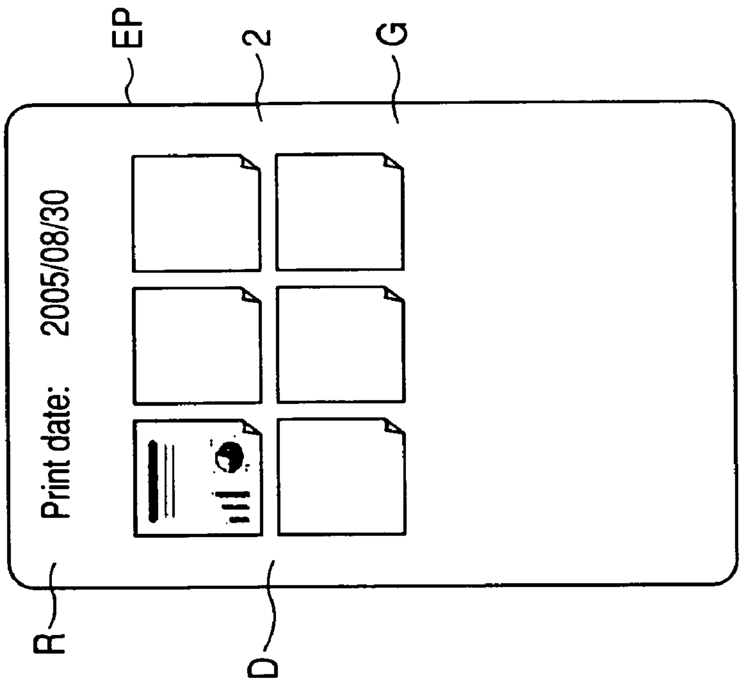
FIGS. 8(*a*) and 8(*b*) are diagrams for explaining an example of the displaying image according to the invention.
Figure 8A:
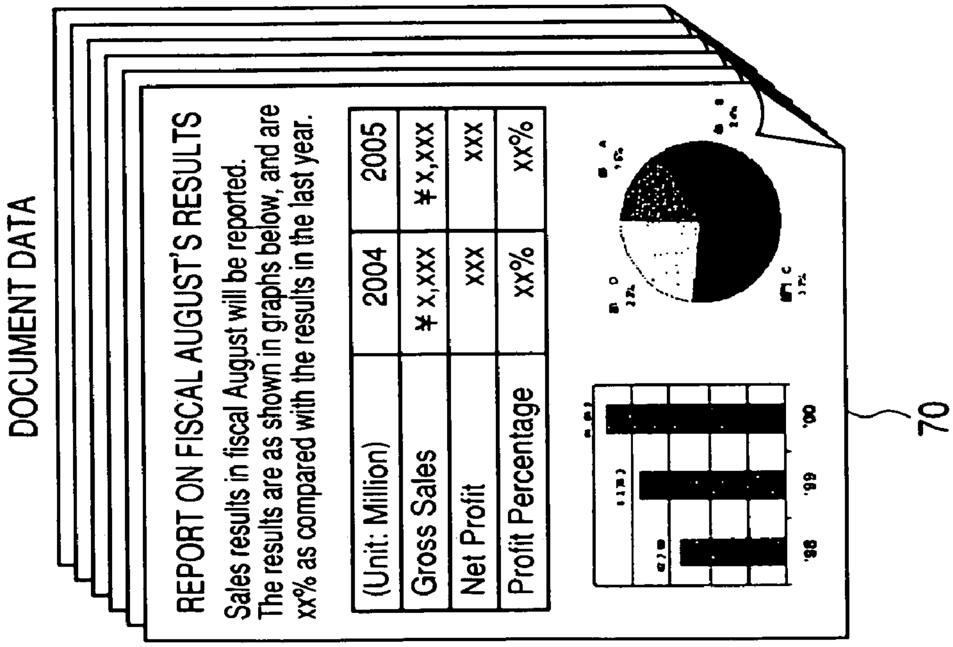

In an example shown in FIGS. 8(*a*) and 8(*b*), the document data of a plurality of pages as shown in FIG. 8(*a*) are used for generating a scale-down image D in which the pages are arranged on one screen, and in which the scale-down degree of the pages is a value designated by the user or set beforehand, as shown in FIG. 8(*b*). That is, the image generation means 56 generates a displaying image G on the basis of the document data of the plurality of pages, and with the size of each page scaled down to a limit at which the characters of stated contents are readable, as shown in FIG. 8(*b*), and the electronic paper printer 42 writes and displays the displaying image G into and on the electronic paper card EP.

Incidentally, it is also allowed to generate a displaying image G which is scaled down so as to make the characters unreadable, contrariwise to the above. Alternatively, it is also allowed to generate a displaying image G in which some or all of characters in a document are replaced with and displayed by signs such as O, x or blanks. Thus, the outline of the document can be grasped from the document scale-down image D by graphs, patterns or the likes contained in this image D, but the detailed contents thereof cannot be understood, so that the secrecy of the document can be held. Besides, such a control of the scale-down degree is applicable to a case where a scale-down image D is generated for a document of one page.

Figure 9A:
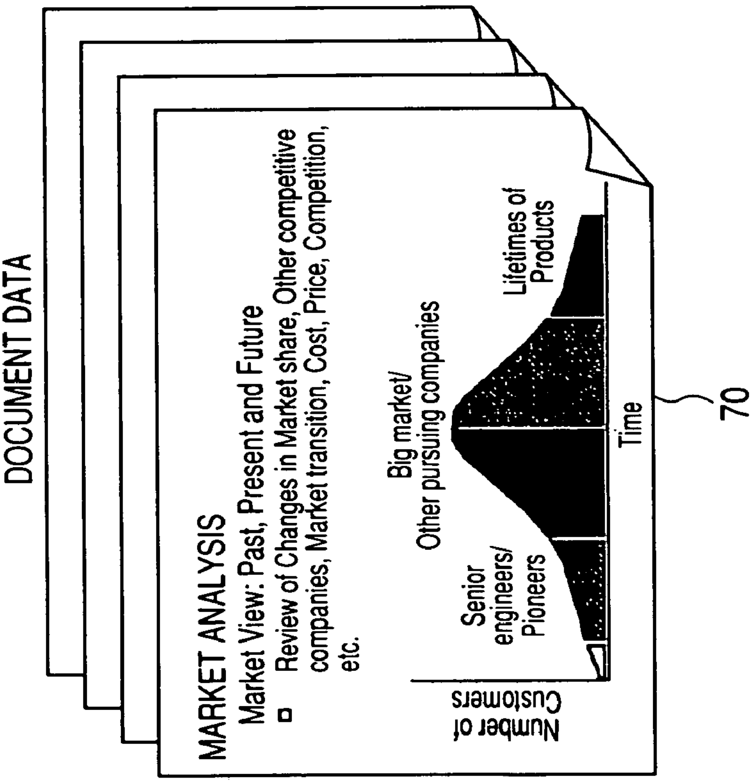
FIGS. 9(*a*) and 9(*b*) are diagrams for explaining an example of the displaying image according to the invention.
Figure 9B:
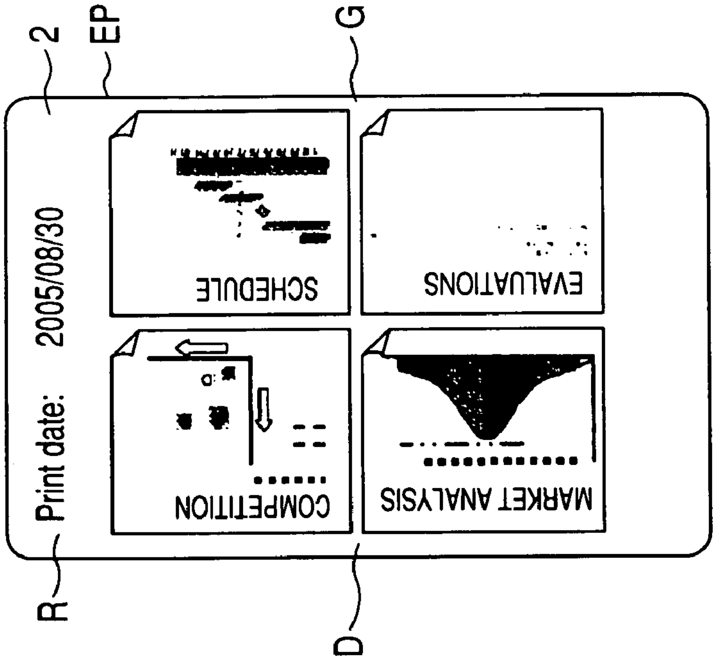

In an example shown in FIGS. 9(*a*) and 9(*b*), the document data of a plurality of pages as shown in FIG. 9(*a*) are used for generating a scale-down image D in which the pages are arranged on one screen, and in which the arrangement aspects of the pages in the scale-down image D are converted with respect to vertical and lateral directions, as shown in FIG. 9(*b*). That is, the image generation means 56 generates a displaying image G in which all the pages are rotated 90 degrees and then arranged as shown in FIG. 9(*b*), on the basis of the document data of the plurality of pages in a laterally long shape, and the displaying image G is written into and displayed on the display unit 2 of the electronic paper card EP in a vertically long shape, whereby the area of the display unit 2 is exploited to the utmost.

Figures 10A, 10B:
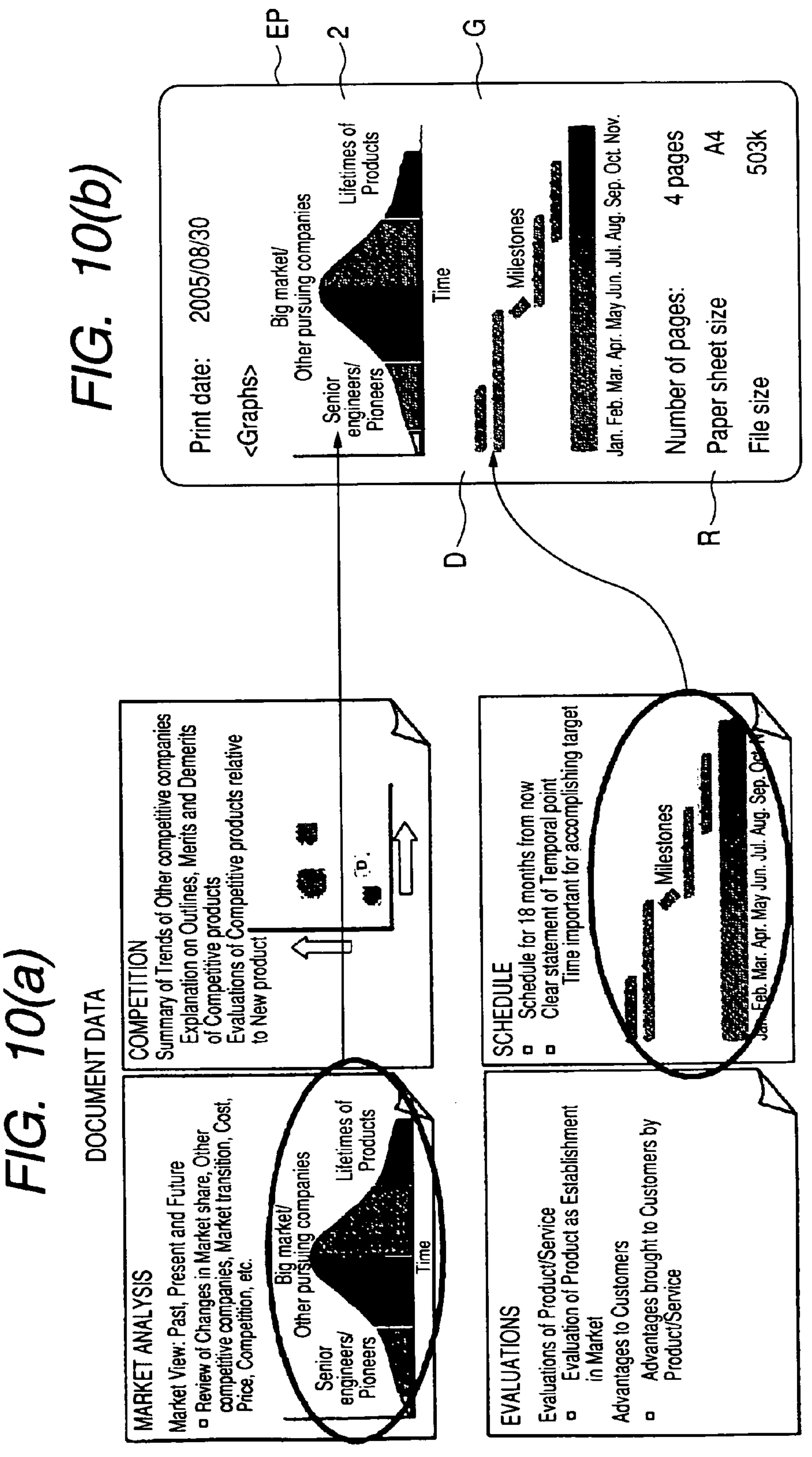
FIGS. 10(*a*) and 10(*b*) are diagrams for explaining an example of the displaying image according to the invention.

In an example shown in FIGS. 10(*a*) and 10(*b*), the document data of a plurality of pages as shown in FIG. 10(*a*) are used for generating a scale-down image D in which parts extracted from within the pages (in this example, featuring graphs or patterns) are put together in accordance with a user selection or a setting selection, as shown in FIG. 10(*b*). A displaying image G which contains the scale-down image D, is written into and displayed on the display unit 2 of the electronic paper card EP.

Figure 11A:
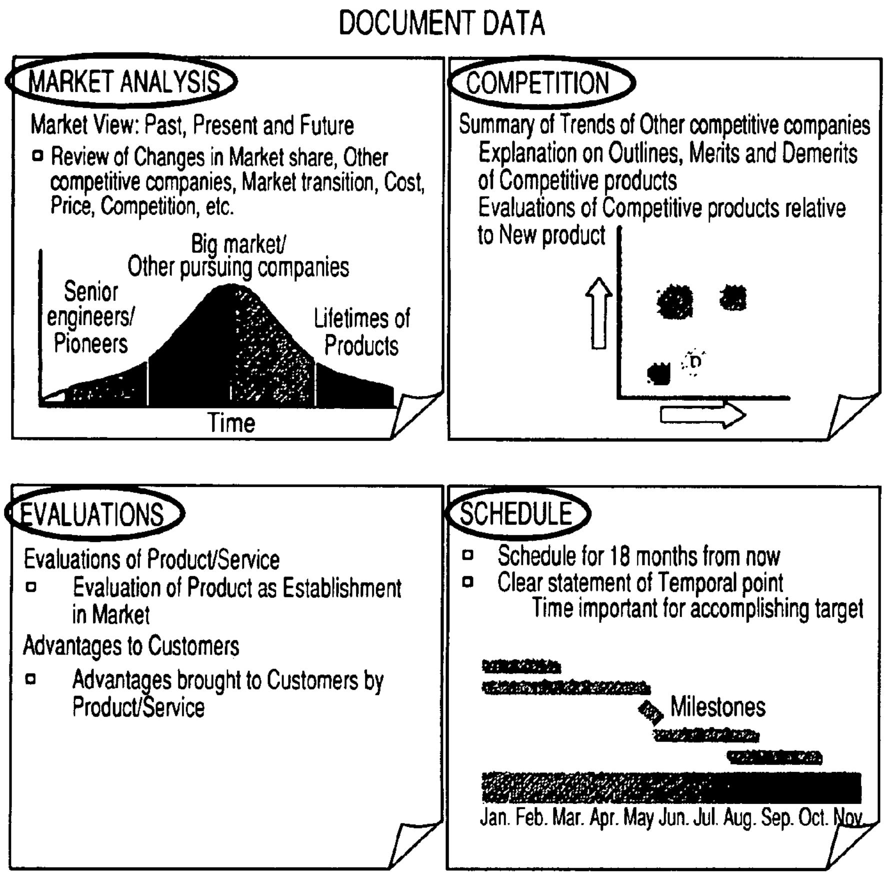
FIGS. 11(*a*) and 11(*b*) are diagrams for explaining an example of the displaying image according to the invention.
Figure 11B:
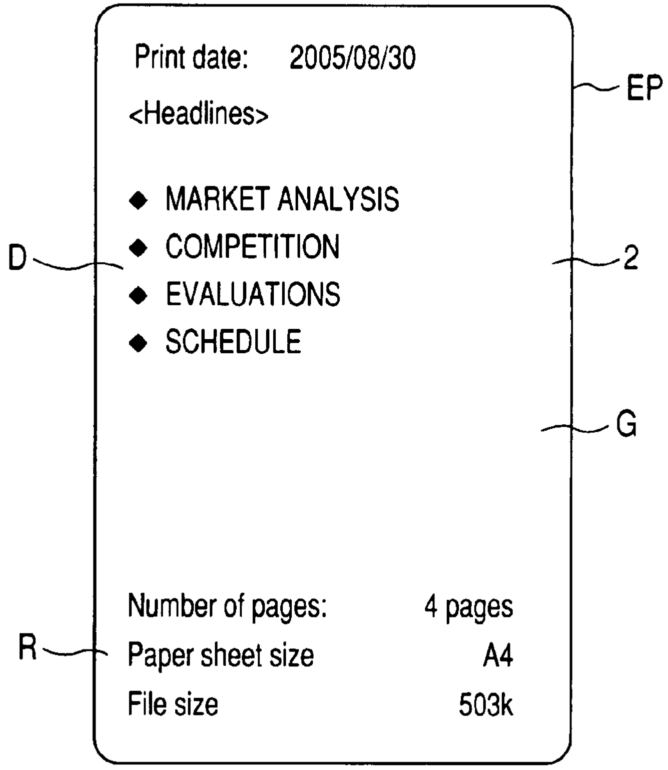

In an example shown in FIGS. 11(*a*) and 11(*b*), the document data of a plurality of pages as shown in FIG. 11(*a*) are used for generating a scale-down image D in which characters of predetermined size within the pages (in this example, the headline character strings of the respective pages) are extracted and are put together in accordance with a user selection or a setting selection, as shown in FIG. 11(*b*). A displaying image G which contains the scale-down image D, is written into and displayed on the display unit 2 of the electronic paper card EP.

Figure 12A:
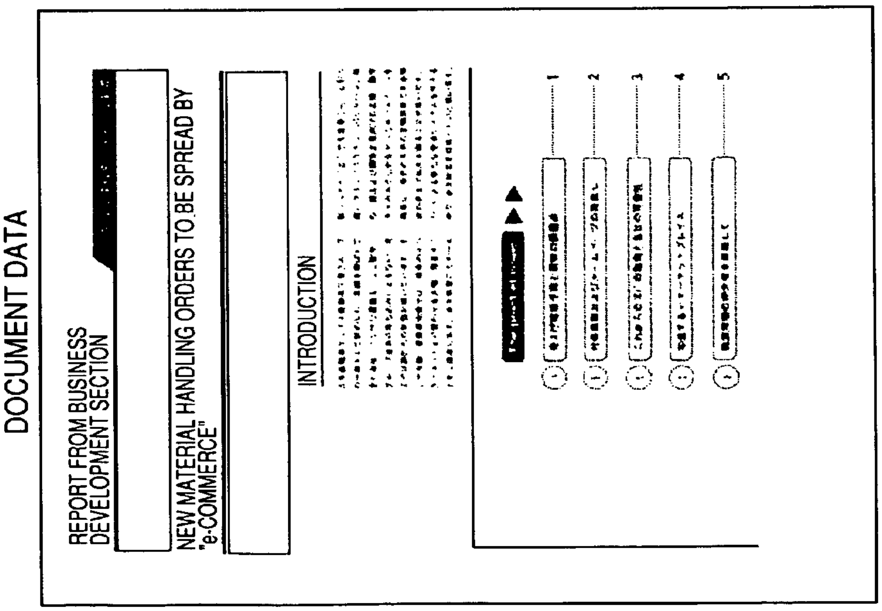
FIGS. 12(*a*) and 12(*b*) are diagrams for explaining an example of the displaying image according to the invention.
Figure 12B:
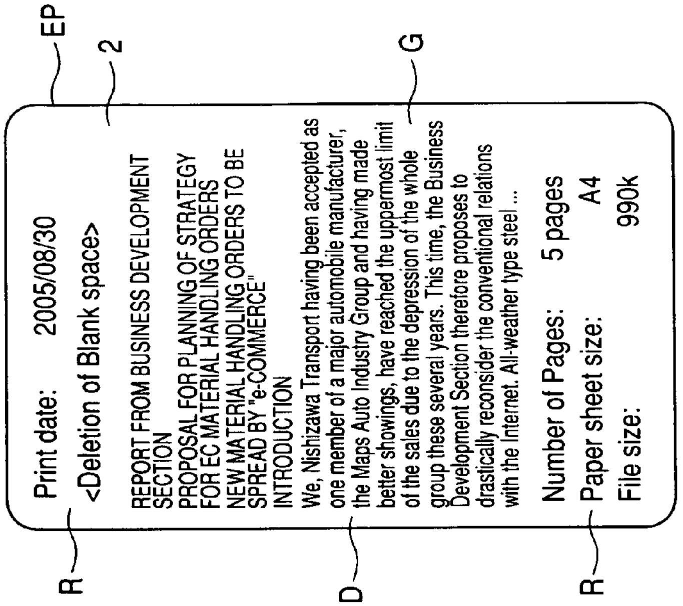

In an example shown in FIGS. 12(*a*) and 12(*b*), on the basis of the document data of a page which contains a large blank space as shown in FIG. 12(*a*), the image generation means 56 generates a scale-down image D by removing the blank space (or by extracting character strings in the page), as shown in FIG. 12(*b*). A displaying image G which contains the scale-down image D, is written into and displayed on the display unit 2 of the electronic paper card EP.

Figure 13B:
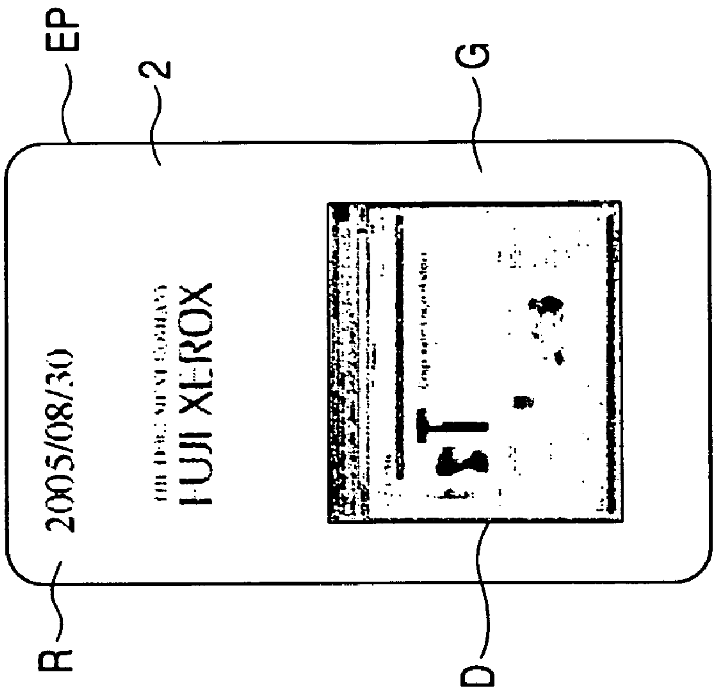
FIGS. 13(*a*) and 13(*b*) are diagrams for explaining an example of the displaying image according to the invention.
Figure 13A:
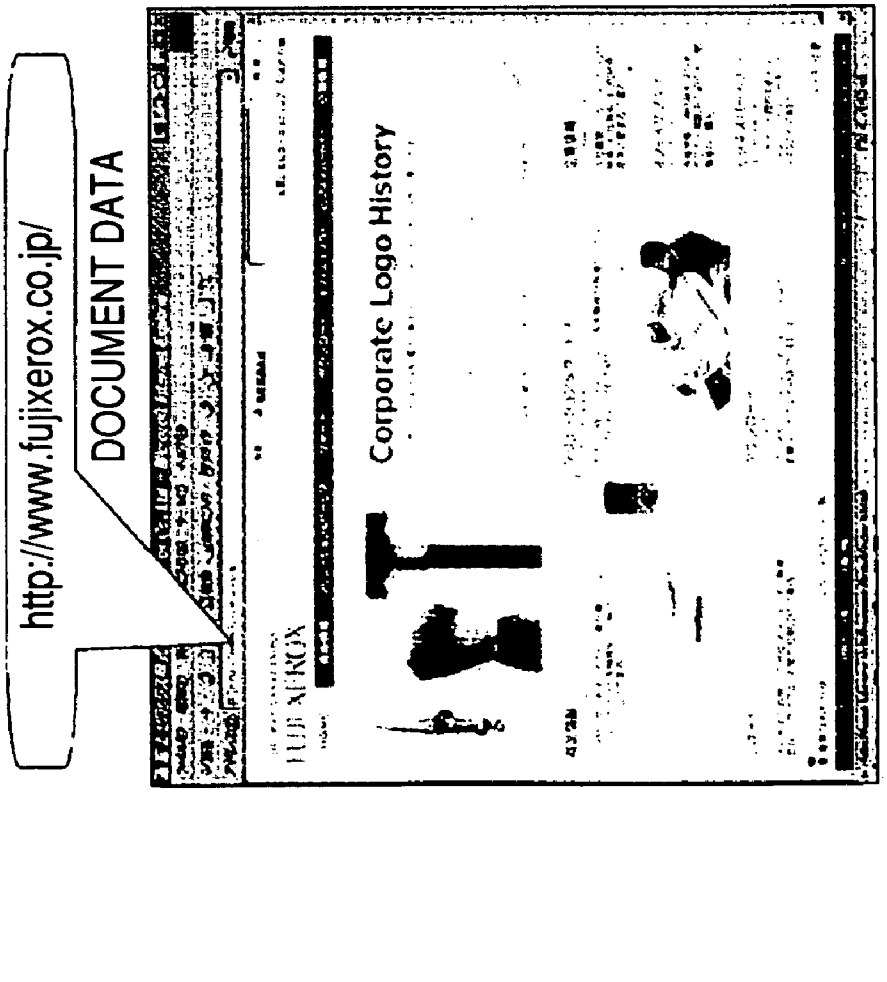

In an example shown in FIGS. 13(*a*) and 13(*b*), on the basis of the document data of a Web page as shown in FIG. 13(*a*), the image generation means 56 generates a scale-down image D which contains a thumb-nail, a title, a banner, etc. selected from within the Web page in accordance with user designations or settings, as shown in FIG. 13(*b*). A displaying image G which contains the scale-down image D, is written into and displayed on the display unit 2 of the electronic paper card EP.

Figure 14A:
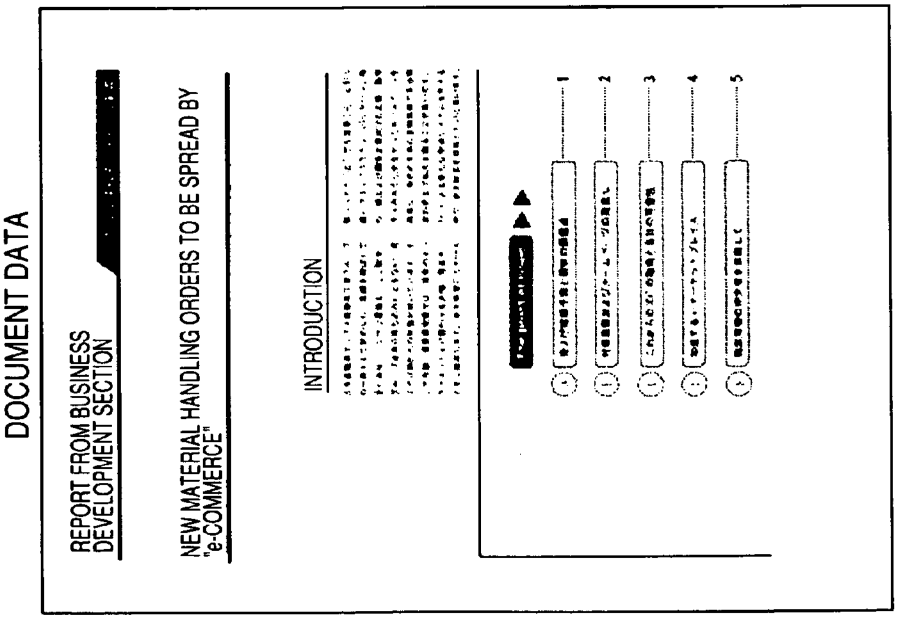
FIGS. 14(*a*) and 14(*b*) are diagrams for explaining an example of the displaying image according to the invention.
Figure 14B:
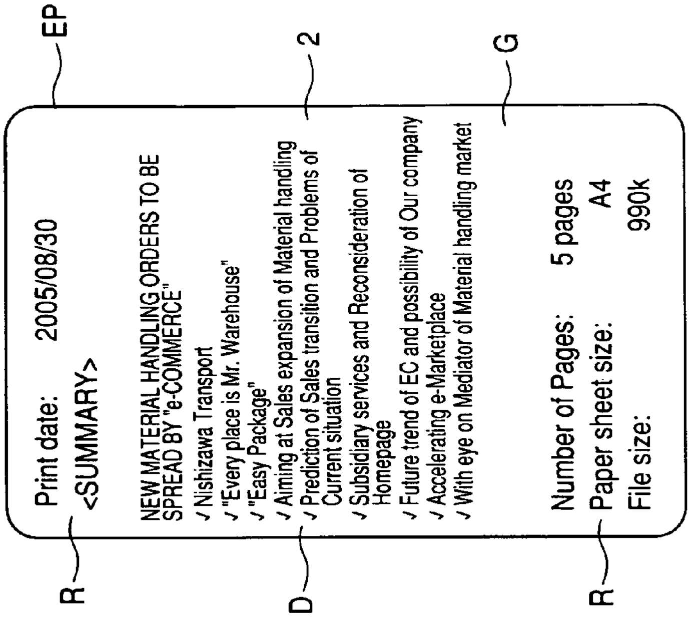

In an example shown in FIGS. 14(*a*) and 14(*b*), on the basis of document data which contain character descriptions as shown in FIG. 14(*a*), the image generation means 56 generates a summary from the character descriptions within a document and generates a displaying image G which contains the summary as a scale-down image D, as shown in FIG. 14(*b*). The displaying image G is written into and displayed on the display unit 2 of the electronic paper card EP.

Figure 15:
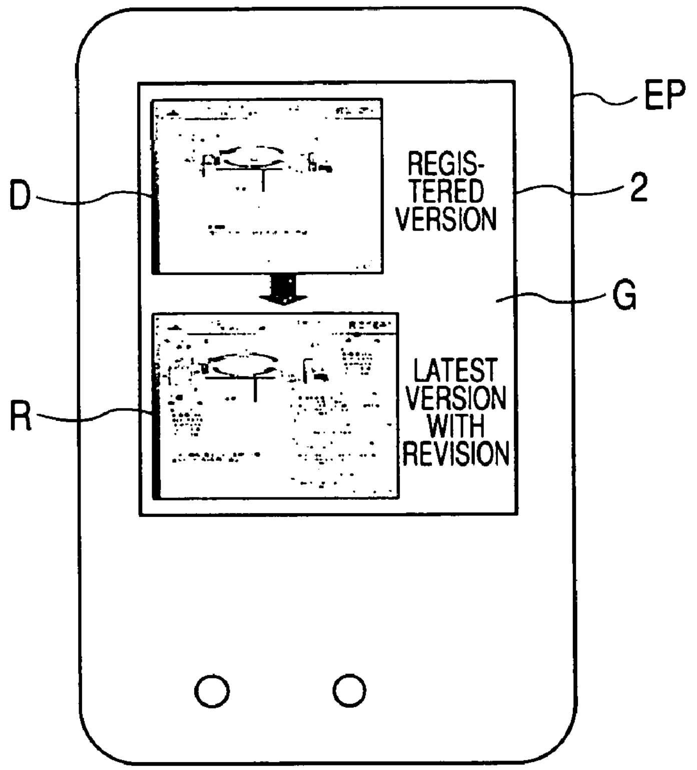
FIG. 15 is a diagram for explaining an example of the displaying image according to the invention.

In an example shown in FIG. 15, the image generation means 56 generates a displaying image G in which an image obtained by scaling down a document of current described contents is contained as a document scale-down image D, and an image obtained by scaling down the document of described contents before the revision of this document is contained as a related information image R. The displaying image G is written into and displayed on the display unit 2 of the electronic paper card EP.

Incidentally, an update history can be displayed as in this example in such a way, for example, that each time document data are updated by the revision or the like, the image generation means 56 generates the scale-down images of respective document images, and that it affixes the scale-down images to the corresponding document data as related information items.

Figure 16:
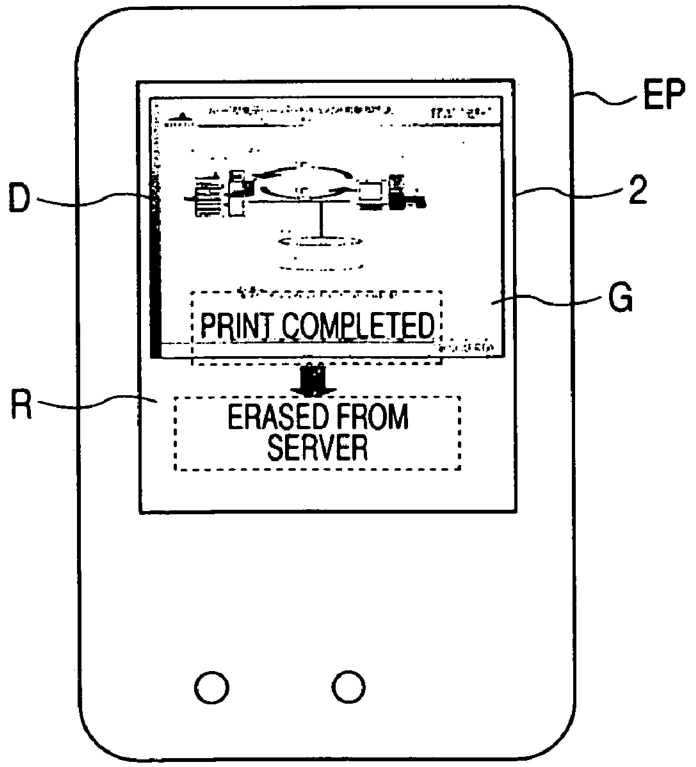
FIG. 16 is a diagram for explaining an example of the displaying image according to the invention.

In an example shown in FIG. 16, the image generation means 56 generates a displaying image G which contains a document scale-down image D, and an image R of related information indicating that a pertinent document has been printed out and erased from the document management server 40. The displaying image G is written into and displayed on the display unit 2 of the electronic paper card EP.

By way of example, with a system setting in which, when document data registered and stored in the document management server 40 have been printed out by the multifunctional machine 41, the corresponding document data are erased from the document management server 40, the image generation means 56 of the multifunctional machine 41, for example, senses the printout, it generates a displaying image G which contains the related information image R of preset "Print completed" and "Erased from server", and the scale-down image D of the printed-out document, and it writes and displays the displaying image G into and on the display unit 2 of the electronic paper card EP.

Figure 17:
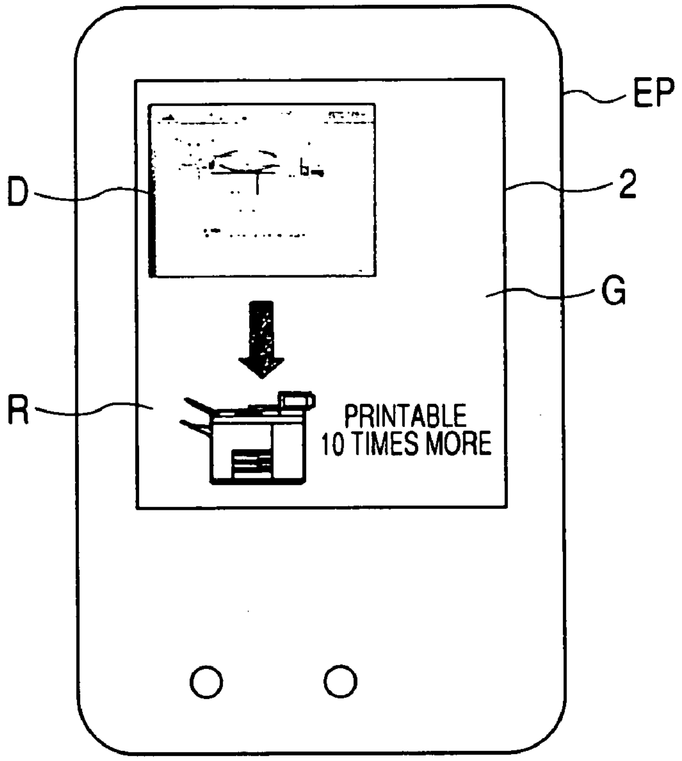
FIG. 17 is a diagram for explaining an example of the displaying image according to the invention.

In an example shown in FIG. 17, the image generation means 56 generates a displaying image G which contains a document scale-down image D, and a related information image R indicating the remaining number of times which a pertinent document can be printed out. The displaying image G is written into and displayed on the display unit 2 of the electronic paper card EP.

By way of example, the maximum number of times which pertinent document data can be printed out is affixed as related information beforehand, and it is decremented each time the multifunctional machine 41 performs a print process. The image generation means 56 of the multifunctional machine 41 senses the print output, and generates a displaying image G which contains the remaining number of times as a related information image G and a printed-out document as a scale-down image D. The displaying image G is written into and displayed on the display unit 2 of the electronic paper card EP.

Figure 18:
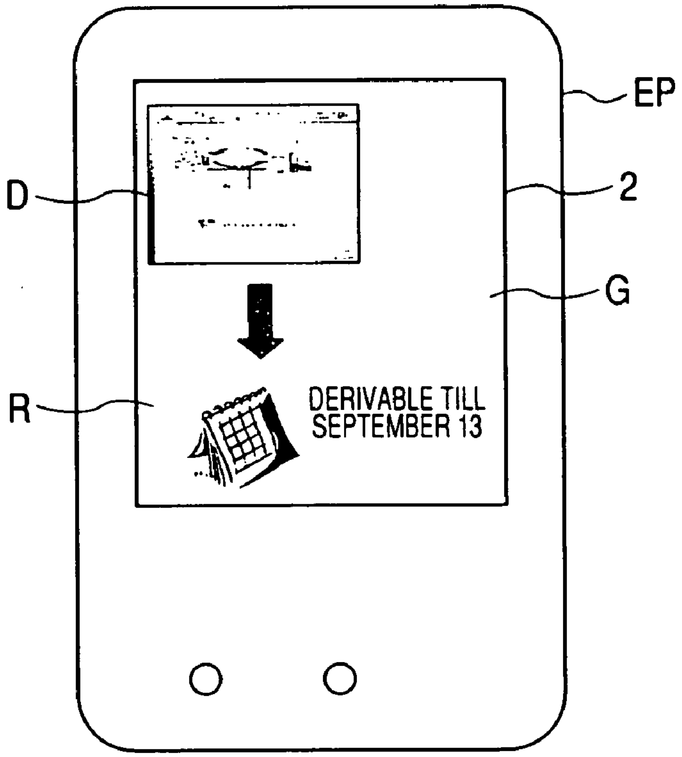
FIG. 18 is a diagram for explaining an example of the displaying image according to the invention.

In an example shown in FIG. 18, the image generation means 56 generates a displaying image G which contains a document scale-down image D, and a related information image R indicating a limit time period for which a pertinent document can be derived from the document management server 40 and utilized. The displaying image G is written into and displayed on the display unit 2 of the electronic paper card EP.

By way of example, a limit time period for which pertinent document data can be utilized is affixed as related information beforehand. The image generation means 56 of the information processing apparatus 41 having derived the document data generates a displaying image G which contains the limit time period as a related information image R and a pertinent document as a scale-down image D, and it writes and displays the displaying image G into and on the display unit 2 of the electronic paper card EP.

Figure 19:
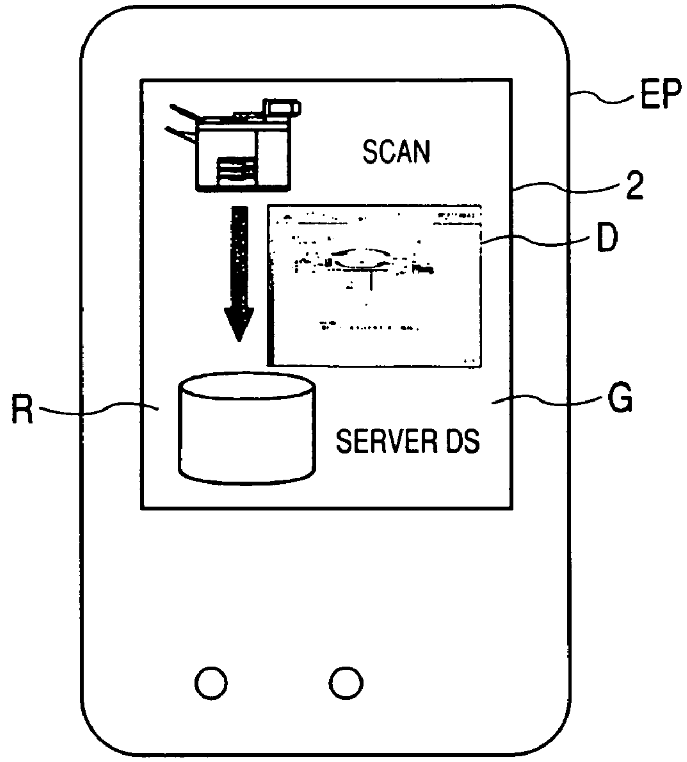
FIG. 19 is a diagram for explaining an example of the displaying image according to the invention.

In an example shown in FIG. 19, the image generation means 56 generates a displaying image G which contains a document scale—down image D, and a related information image R being a pattern that indicates the retention destination of pertinent document data. The displaying image G is written into and displayed on the display unit 2 of the electronic paper card EP.

In a case, for example, where the multifunctional machine 41 has registered and stored document data accepted by scanning document paper, in the document management server (DS) 40, the image generation means 56 of the multifunctional machine 41 generates a displaying image G in which a pertinent document is contained as a scale-down image D, and a pattern indicating the registration and storage of the document in the document management server (DS) 40 is contained as a related information image R. The displaying image G is written into and displayed on the display unit 2 of the electronic paper card EP.

Figure 20:
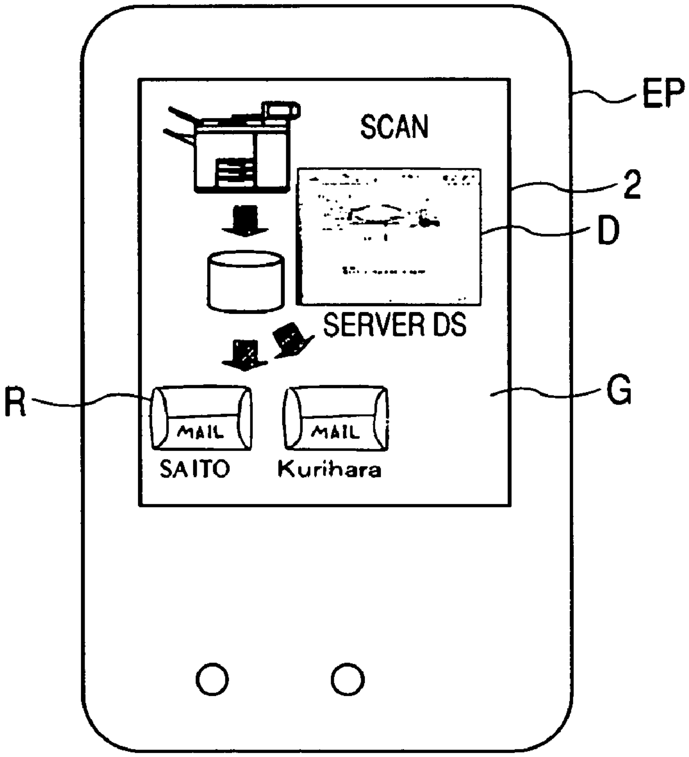
FIG. 20 is a diagram for explaining an example of the displaying image according to the invention.

In an example shown in FIG. 20, the image generation means 56 generates a displaying image G which contains a document scale—down image D, and a related information image R being characters or patterns that indicate the mail transmission destinations of pertinent document data. The displaying image G is written into and displayed on the display unit 2 of the electronic paper card EP.

In a case, for example, where the personal computer 41 has transmitted document data as electronic mail items, the image generation means 56 of the PC 41 generates a displaying image G in which a pertinent document is contained as a scale-down image D, and patterns indicating the transmission destinations of electronic mail items are contained as a related information image R. The displaying image G is written into and displayed on the display unit 2 of the electronic paper card EP.

Figure 21:
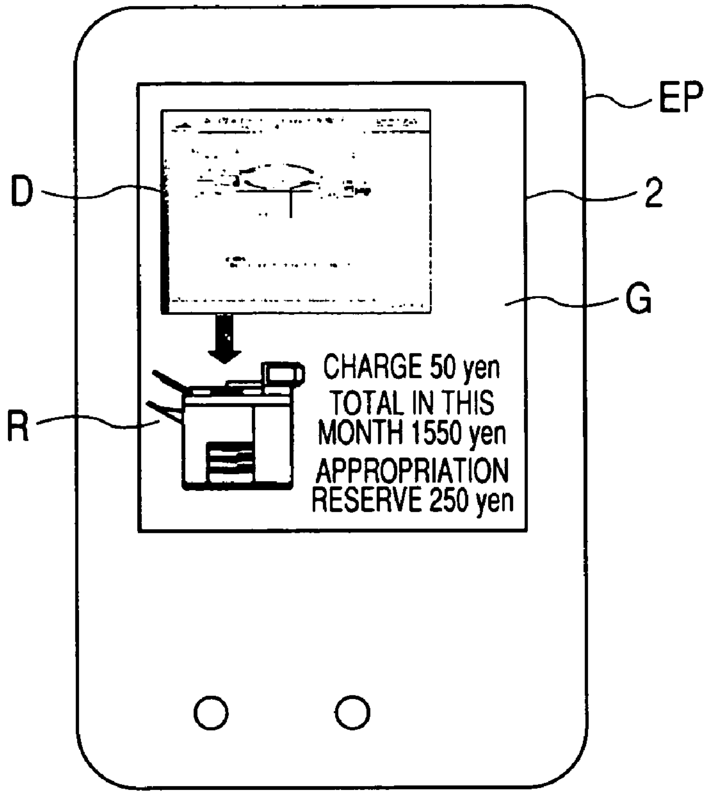
FIG. 21 is a diagram for explaining an example of the displaying image according to the invention.

In an example shown in FIG. 21, the image generation means 56 generates a displaying image G which contains a document scale-down image D, and a related information image R being characters or patterns that indicate charge information items appearing at the printout of pertinent document data. The displaying image G is written into and displayed on the display unit 2 of the electronic paper card EP.

In a case, for example, where the multifunctional machine 41 has printed out document data, the image generation means 56 of this multifunctional machine 41 generates a displaying image G in which a pertinent document is contained as a scale-down image D, and a charge, a total fee, etc. calculated on the basis of a preset unit charge are contained as a related information image R. The displaying image G is written into and displayed on the display unit 2 of the electronic paper card EP.

Figure 22:
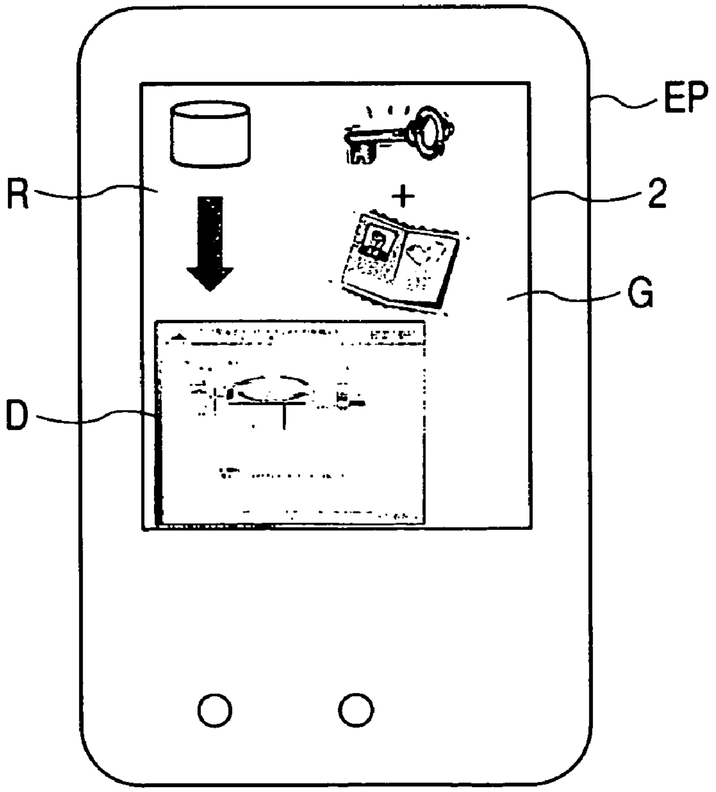
FIG. 22 is a diagram for explaining an example of the displaying image according to the invention.

In an example shown in FIG. 22, the image generation means 56 generates a displaying image G which contains a document scale-down image D, and a related information image R indicating to the effect that the pertinent electronic paper card EP and a predetermined ID card are required for deriving pertinent document data from the document management server 40. The displaying image G is written into and displayed on the display unit 2 of the electronic paper card EP.

In a case, for example, where document data have been registered and stored in the document management server 40, the electronic paper card EP shown in FIG. 22 is outputted from the electronic paper printer 42 in correspondence with a pertinent document. Thereafter, when access is made from the information processing apparatus 41 to the document management server 40 with the intention of deriving the document data, the scanner of the information processing apparatus 41 is caused to read the corresponding electronic paper card EP and a predetermined ID card.

Figure 23:
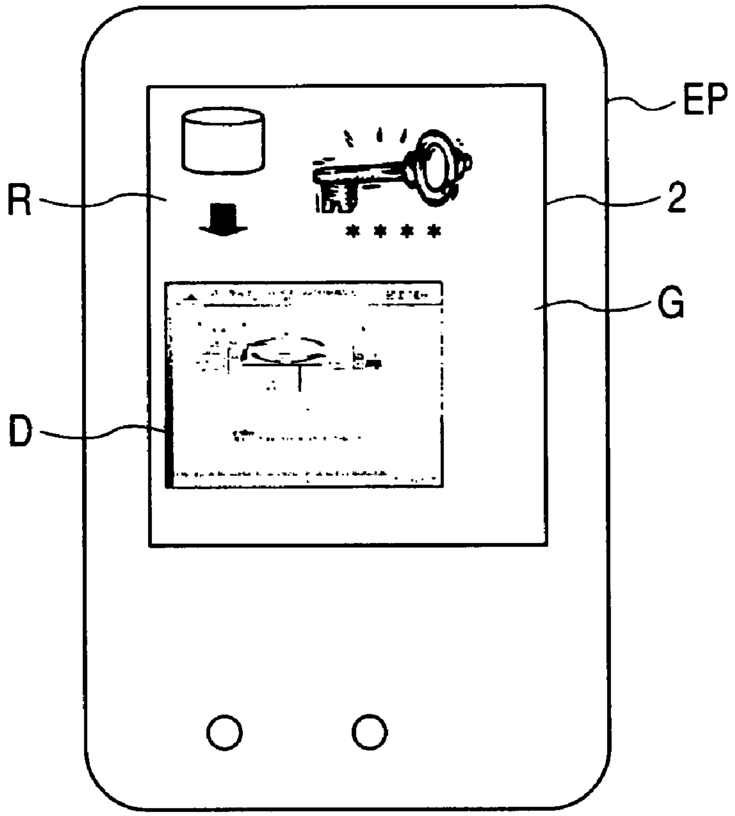
FIG. 23 is a diagram for explaining an example of the displaying image according to the invention.

Incidentally, as exemplified in FIG. 23, a displaying image G may well contain a related information image R indicating to the effect that the pertinent electronic paper card EP and a predetermined password are required for deriving document data from the document management server 40. Such various aspects can be employed.

Figure 24:
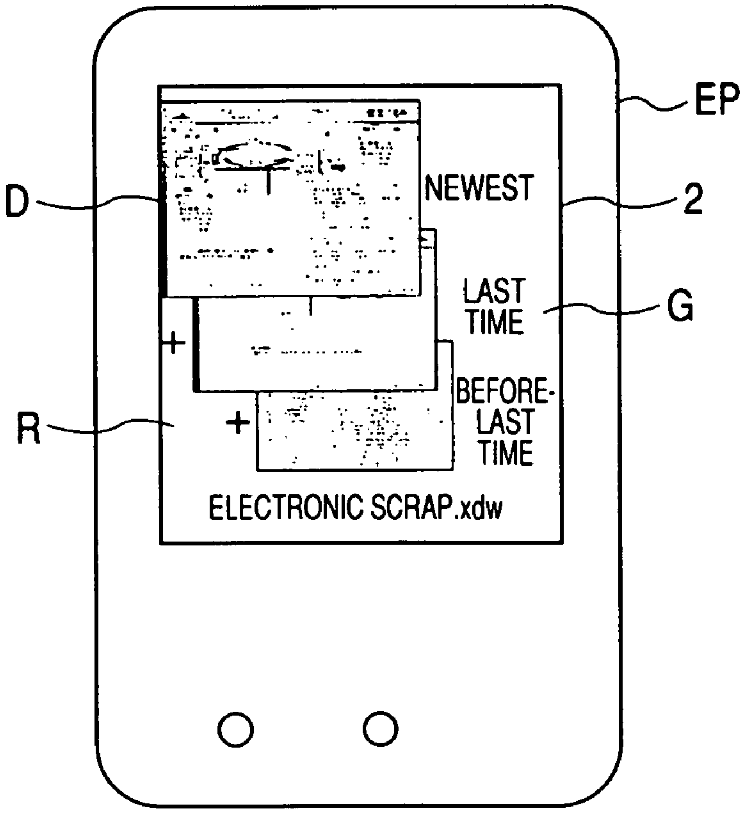
FIG. 24 is a diagram for explaining an example of the displaying image according to the invention.

In an example shown in FIG. 24, the image generation means 56 generates a displaying image G in which an image obtained by scaling down a document of the newest described contents is contained as a document scale-down image D, and images obtained by scaling down other documents merged in order to create the pertinent document are contained as a related information image R. The displaying image G is written into and displayed on the display unit 2 of the electronic paper card EP.

Incidentally, by way of example, each time document data are updated by editing or the like, the image generation means 56 generates the scale-down images of respectively corresponding document images, and it affixes the scale-down images to the document data as related information items, whereby an update history can be displayed as in this example.

Figure 25:
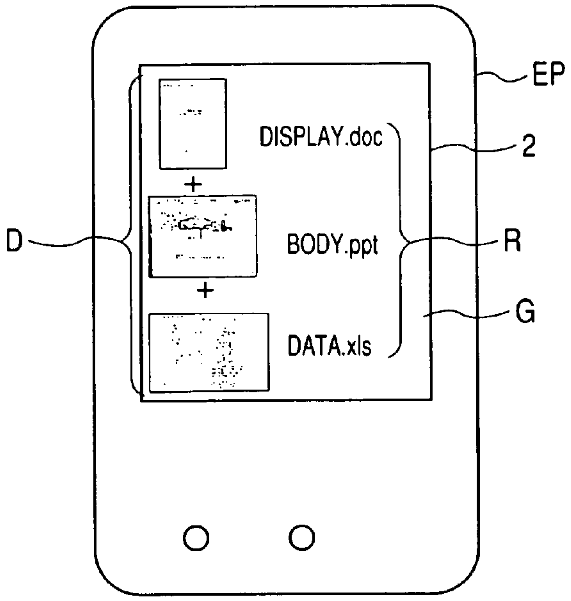
FIG. 25 is a diagram for explaining an example of the displaying image according to the invention.

In an example shown in FIG. 25, in a case where document data are complex data in which descriptive parts of various forms such as "doc", "ppt" and "xls" are combined, the image generation means 56 generates a displaying image G which contains the scaled-down images of respective documents as a document scale-down image D and the forms of the respective documents as a related information image R, and which is written into and displayed on the display unit 2 of the electronic paper card EP.

As discussed above, the present invention can be embodied to permit the content, form etc. of document data to be easily grasped, by utilizing electronic paper of thin type which has a display unit for displaying and retaining an image in a no-power state. That is, the present invention can be carried out in various aspects such as an electronic paper system by which a displaying image that contains the scale-down image of a document and the image of the related information of the document is displayed on and retained in the display unit of the electronic paper, an information processing apparatus which is incarnated by a multifunctional apparatus having a scanner function, etc., a PC, or the like and which constitutes the electronic paper system, a program which configures the information processing apparatus by a computer, and an image writing method which is performed by the electronic paper system.

Here, a thumb-nail image is common as the "scale-down image of the document". In more detail, however, whereas substantially the full display size of the display unit of the electronic paper is the ordinary size of a document image, the scale-down image of the document is a document image which is smaller than the ordinary size. The degree of the scale-down of the scale-down image is any desired value as may be needed.

In an illustrative, non-limiting embodiment of the invention, image generation means on the side of an information processing apparatus generates a displaying image in which the scale-down image of a document and the image of the related information of the document (the number of pages, the title, the creation date, etc. of the document) are combined, and write means (a write device) annexed to the image processing apparatus (for example, connected to or built in the apparatus) writes the generated displaying image into the display unit of electronic paper.

Thus, when a user looks at the displaying image displayed on the electronic paper, he/she can grasp the document and aspect of document data which can be derived in conformity with a document identifier (the storage destination URL of the document data, the ID of the document data, or the like) that is retained in storage means (an RFID memory or the like) disposed in the electronic paper.

Besides, the image generation means may well select a part of the document or part of the related information as is to be contained in the displaying image, in accordance with a designation based on a preset condition or an instruction from a user, and then generate the displaying image. By the way, in a case where the designation is based on the instruction from the user, the information processing apparatus is provided with user interface means for presenting the document image or related information image as a screen display or the like, and for allowing the user to select the part of the document or the part of the related information as is to be contained in the displaying image.

Thus, the displaying image can be presented in, for example, an aspect in which the related information of the displaying image contains only information items of high necessity among various related information items affixed to the document, an aspect in which the document scale-down image of the displaying image contains only a featuring part (for example, a graph or pattern) in the contents of the document, an aspect in which the document scale-down image of the displaying image contains only large characters forming headlines, in the document contents, an aspect in which the document scale-down image of the displaying image contains only descriptive characters in the document contents, or an aspect in which the document scale-down image of the displaying image contains only the title or banner of the document as is contained in the document. In such an aspect, the user is permitted to more easily grasp the contents, etc. of the document.

Besides, it is also allowed that the candidate generation means of the information processing apparatus causes the image generation means to generate a plurality of displaying image candidates in which the aspects of the document scale-down image or the document related information image to be contained in the displaying image are different, and that the user interface means of the information processing apparatus presents the displaying image candidates to the user and then allows the user to select any of the candidates, so as to write the selected candidate into the electronic paper.

Thus, the user interface means can present the displaying image candidates which contain various scale-down images where the document having a plurality of pages is arranged with a certain page made larger than the other pages by way of example, and the write means can write into the electronic paper, the displaying image which the user likes among the candidates.

Besides, the image generation means may well set the document scale-down image which is to be contained in the displaying image, at a scale-down degree which conforms to a preset condition or an input designated by the user.

Thus, it is possible that the scale-down image is generated at such an extent of size at which the user can read characters in the document, and that it is written into and displayed on the electronic paper, or that the scale-down image is generated at such an extent of size at which the user cannot read characters, but he/she can understand the outline of the document from a pattern, a graph or the like in the document, and that it is written into and displayed on the electronic paper, so as to prevent secrecy from leaking due to the display on the electronic paper.

Besides, the image generation means may well convert the vertical and lateral directions of the individual pages of the document as are to be contained in the scale-down image, and then rearrange the pages, in accordance with the shape of the display unit of the electronic page, the rearranged pages being contained in the displaying image.

Thus, in case of, for example, a laterally long display unit, the vertical and lateral directions of the plurality of pages of a vertically long document are converted so as to rearrange the pages, whereby the displaying image which contains the scale-down image of the plurality of pages can be displayed on the display unit in an aspect where this display unit is effectively utilized with a wasteful blank space suppressed.

Besides, the image generation means may well generate the summary of the document as the document scale-down image which is to be contained in the displaying image.

In the illustrative, non-limiting embodiment of the present invention, a displaying image which contains the scale-down image and related information image of a pertinent document is displayed on and retained in electronic paper which is associated with document data by electronic data such as a URL. Accordingly, a user can bring contents grasped by the displaying image, into correspondence with the document data, and the desired document data can be quickly specified by the electronic paper.

The entire disclosure of Japanese Patent Application No. 2005-265535 filed on Sep. 13, 2005 including specification, claims, drawings and abstract is incorporated herein by reference in its entirety.

The invention claimed is:

1. An electronic paper system comprising:

electronic paper having a display unit that displays and retains an image in a no-power state;

an image generation unit that generates a displaying image by combining a document scale-down image that includes at least part of a document, with text information, selected by a user and a related information image of at least part of related attribute information of the document selected by a user; and a write unit that writes the generated displaying image into the display unit of the electronic paper so that the display unit displays and retains the generated displaying image, wherein the document scale-down image includes a scale-down image, and the text information included in the document-scale down image is replaced with signs.

2. An electronic paper system as defined in claim 1, wherein:

in accordance with a designation, the image generation unit selects the part of the document or the part of the related attribute information to be contained in the displaying image, and generates the displaying image based on the selection.

3. An electronic paper system as defined in claim 2, further comprising:

a user interface unit that allows a user to select the part of the document or the part of the related attribute information; and wherein the image generation unit generates the displaying image in compliance with an instruction of the user selection.

4. An electronic paper system as defined in claim 1, further comprising:

a candidate image generation unit that causes the image generation unit to generate plural displaying image candidate images in which aspects of the document scale-down image or the document related attribute information image to be contained in the displaying image are different; and a user interface unit that presents the displaying image candidates to a user and allows the user to select any of the candidates;

wherein the write unit writes the displaying image of the candidate selected by the user, into the display unit of the electronic paper.

5. An electronic paper system as defined in claim 1, wherein the image generation unit sets the document scale-down image which is to be contained in the displaying image, at a predetermined scale-down degree.

6. An electronic paper system as defined in claim 1, wherein:

in accordance with a shape of the display unit of the electronic paper, the image generation unit converts vertical and lateral directions of individual pages of the document to arrange the pages in the scale-down image, and generates the displaying image containing the arranged pages.

7. An electronic paper system as defined in claim 1, wherein:

the image generation unit generates a summary of the document as the document scale-down image which is to be contained in the displaying image.

8. An electronic paper system as defined in claim 1, wherein:

the image generation unit generates an image, in which some or all of characters of the document are replaced with a blank space or signs, as the document scale-down image which is to be contained in the displaying image.

9. An electronic paper system as defined in claim 1, wherein the image generation unit and the write unit are included in an information processing apparatus side to which the electronic paper is detachably set.

10. An electronic paper system as defined in claim 1, wherein the write unit is included in the electronic paper.

11. An information processing apparatus for an electronic paper system having a write device that writes an image into a display unit of electronic paper so that the display unit of the electronic paper displays and retains the image in a no-power state, the apparatus comprising:

an image generation unit that generates a displaying image by combining a document scale-down image that includes at least part of a document with text information selected by a user and a related information image of at least part of related attribute information of the document selected by a user; and an output unit that outputs the generated displaying image to the write device so that the displaying image is written into the display unit of the electronic paper by the write device, wherein the document scale-down image includes a scale-down image, the text information included in the document scale-down image is replaced with signs.

12. An information processing apparatus for an electronic paper system as defined in claim 11, wherein:

in accordance with a designation, the image generation unit selects the part of the document or the part of the related attribute information to be contained in the displaying image, and generates the displaying image based on the selection.

13. An information processing apparatus for an electronic paper system as defined in claim 12, further comprising:

a user interface unit that allows a user to select the part of the document or the part of the related attribute information;

wherein the image generation unit generates the displaying image in compliance with an instruction of the user selection.

14. An information processing apparatus for an electronic paper system as defined in claim 11, further comprising:

a candidate generation unit that causes said image generation unit to generate plural displaying image candidates in which aspects of the document scale-down image or the document related attribute information image to be contained in the displaying image are different; and a user interface unit that presents the displaying image candidates to a user and allows the user to select any of the candidates;

wherein the output unit outputs the displaying image of the candidate selected by the user so that the write device writes the displaying image of the candidate selected by the user into the display unit of the electronic paper.

15. A non-transitory storage medium readable by a computer, the storage medium storing an image processing program of instructions executable by the computer to perform a function for generating a displaying image that is to be written into a display unit of electronic paper by a write unit and that is to be displayed on and retained in the display unit of the electronic paper in a no-power state, the function comprising the steps of:

obtaining a document scale-down image of at least a part of a document and a related attribute information image of at least part of related attribute information of the document; and combining document scale-down image that includes at least part of a document with text information selected by a user, the related attribute of a related information image selected by a user, information image to generate the displaying image, wherein the document scale-down image includes a scale-down image, the text information included in a document scale-down image is replaced with signs.

16. An image writing method of causing a display unit of electronic paper to display and retain an image in a no-power state using an information processing apparatus, the method comprising the steps of:

generating a displaying image by combining a document scale-down image that includes at least part of a document with text information selected by a user and a related information image of at least part of related attribute information of the document selected by a user using an image generation unit of the image processing apparatus; and writing the generated displaying image into the display unit of the electronic paper using a write device annexed to the information processing apparatus under a control of the information processing apparatus, wherein the document scale-down image includes a scale-down image, the text information included in a document scale-down image is replaced with signs.

17. An electronic paper system as defined in claim 1, wherein the related attribute information includes a number of pages, a paper sheet size, a file size, a print date and a retention period.

18. An information processing apparatus for an electronic paper system as defined in claim 11, wherein the related attribute information includes a number of pages, a paper sheet size, a file size, a print date and a retention period.

19. A storage medium readable by a computer as defined in claim 15, wherein the related attribute information includes a number of pages, a paper sheet size, a file size, a print date and a retention period.

20. An image writing method as defined in claim 16, wherein the related attribute information includes a number of pages, a paper sheet size, a file size, a print date and a retention period.

21. An electronic paper system as defined in claim 1, wherein the related attribute information includes retention place of document data, document title, paper sheet size of the document, number of pages of the document, size of the document data and creation data of the document.

22. An information processing apparatus for an electronic paper system as defined in claim 11, wherein the related attribute information includes retention place of document data, document title, paper sheet size of the document, number of pages of the document, size of the document data and creation data of the document.

23. A storage medium readable by a computer as defined in claim 15, wherein the related attribute information includes retention place of document data, document title, paper sheet size of the document, number of pages of the document, size of the document data and creation data of the document.

24. An image writing method as defined in claim 16, wherein the related attribute information includes retention place of document data, document title, paper sheet size of the document, number of pages of the document, size of the document data and creation data of the document.

25. An electronic paper system as defined in claim 1, wherein the document scale-down image removes the text information included in the document selected by the user.

* * * * *